United States Patent
Keronen et al.

(10) Patent No.: US 7,121,462 B2
(45) Date of Patent: Oct. 17, 2006

(54) USER PROGRAMMABLE SMART CARD INTERFACE SYSTEM

(75) Inventors: Seppo Reino Keronen, Eastwood (AU); Sue-Ken Yap, Lane Cove (AU); Philip Keith Robertson, Middle Cove (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/657,234

(22) Filed: Sep. 9, 2003

(65) Prior Publication Data

US 2004/0050933 A1 Mar. 18, 2004

Related U.S. Application Data

(63) Continuation of application No. 09/414,558, filed on Oct. 8, 1999, now abandoned.

(30) Foreign Application Priority Data

| Oct. 8, 1998 | (AU) | .................................... PP6419 |
| May 11, 1999 | (AU) | .................................... PQ0289 |
| May 11, 1999 | (AU) | .................................... PQ0290 |
| Jul. 27, 1999 | (AU) | .................................... PQ1852 |

(51) Int. Cl.
G06K 5/00 (2006.01)
G06K 19/06 (2006.01)

(52) U.S. Cl. ...................................... 235/380; 235/492

(58) Field of Classification Search ................ 235/380, 235/487, 492; 902/25, 26, 41; 705/17, 25, 705/41

See application file for complete search history.

(56) References Cited

U.S. PATENT DOCUMENTS

| 4,977,310 A | 12/1990 | Studer et al. ................ 235/375 |
| 5,002,062 A | 3/1991 | Suzuki ........................ 128/696 |
| 5,015,830 A | 5/1991 | Masuzawa et al. .......... 235/441 |
| 5,331,555 A | 7/1994 | Hashimoto et al. .......... 715/531 |
| 5,353,016 A | 10/1994 | Kurita et al. ........... 340/825.22 |
| 5,412,416 A | 5/1995 | Nemirofsky .................. 348/10 |
| 5,430,496 A | 7/1995 | Silverbrook ................. 348/389 |
| 5,434,395 A | 7/1995 | Storck et al. ................ 235/380 |
| 5,461,222 A | 10/1995 | Haneda ....................... 235/492 |
| 5,479,205 A | 12/1995 | Silverbrook ................. 348/239 |
| 5,572,573 A | 11/1996 | Sylvan et al. ................ 455/556 |

(Continued)

FOREIGN PATENT DOCUMENTS

DE 3637684 5/1987

(Continued)

OTHER PUBLICATIONS

"IntelliKeys, Effective, Powerful, and Affordable," product information, http://www.intellitools.com/intellik_ys-text.html, no date available.

*Primary Examiner*—Jared J. Fureman
(74) *Attorney, Agent, or Firm*—Fitzpatrick, Cella, Harper & Scinto

(57) ABSTRACT

A user programmable smart card interface system is disclosed having a smart card (10) and a reader/writer (1) which is able to read data from, and write data into, an electronic memory (19) carried by the card. A user terminal (100) having processing capacity can be used by a user to write customised data into the electronic memory (19). The user is then able to utilise his own data to control a data controlled equipment (120) as the user desires. A storage apparatus (1000) for smart cards and smart cards (501) with a tactile operating surface arc also disclosed.

64 Claims, 24 Drawing Sheets

U.S. PATENT DOCUMENTS

| | | | |
|---|---|---|---|
| 5,583,539 A | 12/1996 | Hiketa et al. | 348/146 |
| 5,594,493 A | 1/1997 | Nemirofsky | 348/13 |
| 5,601,489 A | 2/1997 | Komaki | 463/44 |
| 5,761,485 A | 6/1998 | Munyan | 345/839 |
| 5,845,160 A | 12/1998 | Patton | 396/312 |
| 5,878,292 A | 3/1999 | Bell et al. | 396/312 |
| 5,914,707 A | 6/1999 | Kono | 345/173 |
| 5,949,492 A | 9/1999 | Mankovitz | 348/473 |
| 5,973,475 A | 10/1999 | Combaluzier | 320/107 |
| 6,014,593 A | 1/2000 | Grufman | 700/136 |
| 6,032,857 A | 3/2000 | Kitagawa et al. | 235/379 |
| 6,072,980 A | 6/2000 | Manico et al. | 434/317 |
| 6,223,348 B1 | 4/2001 | Hayes et al. | 725/152 |
| 6,229,694 B1 | 5/2001 | Kono | 361/683 |
| 6,249,644 B1 | 6/2001 | Inoue et al. | 386/130 |
| 6,308,202 B1 | 10/2001 | Cohn et al. | 709/217 |
| 6,327,459 B1 * | 12/2001 | Redford et al. | 434/307 R |
| 6,408,301 B1 | 6/2002 | Patton et al. | 707/102 |
| 6,628,509 B1 * | 9/2003 | Kono | 361/681 |
| 2001/0017616 A1 | 8/2001 | Kobayashi | 345/173 |
| 2002/0158849 A1 | 10/2002 | Severson | 345/173 |

FOREIGN PATENT DOCUMENTS

| | | |
|---|---|---|
| EP | 400221 | 5/1990 |
| EP | 469 581 | 2/1992 |
| EP | 606287 | 7/1994 |
| EP | 0793186 | 9/1997 |
| EP | 816 989 | 1/1998 |
| EP | 827 733 | 3/1998 |
| EP | 1039772 | 9/2000 |
| FR | 2 618 003 | 1/1989 |
| FR | 2696888 | 4/1994 |
| FR | 2721730 | 12/1995 |
| JP | 59-123986 | 7/1984 |
| JP | 04-88547 | 3/1992 |
| JP | 08-68541 | 3/1996 |
| JP | 08-129236 | 5/1996 |
| JP | 08-294080 | 11/1996 |
| JP | U 03-071329 | 6/2000 |
| WO | WO 93/07715 | 4/1993 |
| WO | WO 95/20294 | 7/1995 |
| WO | WO 95/35534 | 12/1995 |
| WO | WO 96/32702 | 10/1996 |
| WO | 97/05568 | 2/1997 |
| WO | 98/40863 | 9/1998 |

* cited by examiner

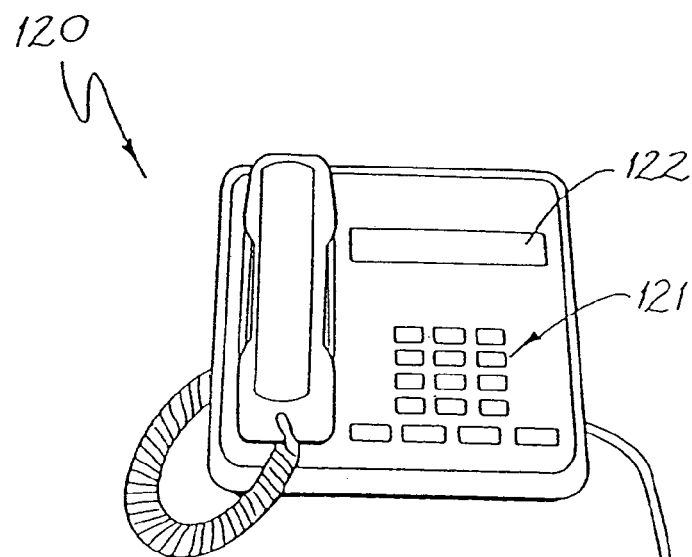
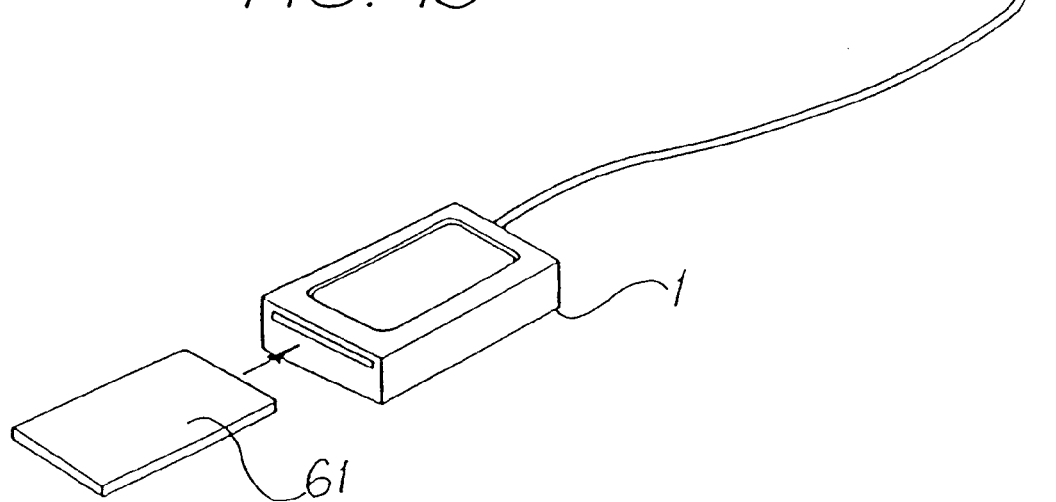
FIG. 13

USER PROGRAMMABLE SMART CARD INTERFACE SYSTEM

This application is a continuation application of application Ser. No. 09/414,558, filed on Oct. 8, 1999, now abandoned.

TECHNICAL FIELD OF THE INVENTION

The present invention relates to a control template or smart card for use with a related control device, as well as methods of production and use of such a control template.

The invention has been developed primarily for use with remote control systems. automatic tellers and video game controllers, and will be described hereinafter with reference to these and other applications. However, it will be appreciated, particularly in view of the large number of alternative examples given, that the invention is not limited to these fields of use.

BACKGROUND

Control pads of various types are known and used across a relatively wide variety of fields. Typically, such pads include one or more keys, buttons or pressure responsive areas which upon application of suitable pressure by a user, generate a signal which is supplied to associated control circuitry.

Unfortunately, prior art control pads are somewhat limited, in that they only allow for a single configuration of keys, buttons or pressure sensitive areas. Standard layouts rarely exist in a given field, and so a user is frequently compelled to learn a new layout with each control pad they use. For example many automatic teller machines ("ATMs") and electronic funds transfer at point of sale ("EFTPOS") devices use different layouts, notwithstanding their relatively similar data entry requirements. This can be potentially confusing for a user who must determine for each control pad the location of buttons required to be depressed. The problem is exacerbated by the fact that such control pads frequently offer more options than the user is interested in or even able to use.

Overlay templates for computer keyboards and the like arc known. However they are relatively inflexible in design terms and require a user to correctly configure the system with which the keyboard is associated, each time the overlay is to be used.

It is the object of the present invention to provide a control template or smart card which is useful in a wide range of applications. In particular, in order to achieve the broadest utility it is desirable to have third parties other than the card manufacturer and the ultimate end user able to program the card with either the third party's intended use or the ultimate end user's intended use.

Novelty searches conducted after the earliest priority date of the present application disclosed International Patent Application No. PCT/FR95/00827 published in French under International Patent Publication No. WO 95/35534. An English language translation of the specification is conveniently available as Australian Patent Publication No. AU-A-28896/95. That specification discloses a card reading device (also referred to as a control housing) intended for the remote control of equipment, for example. The control housing consisted of a transparent key pad arranged to overlie a smart card/memory card having indicia regularly arranged on the surface of the card at positions corresponding to the keys on the keypad.

Thus a television manufacturer, for example, could manufacture such a smart card and supply the smart card together with the control housing and a television. Then the customer would be able to utilise the control housing in conjunction with the smart card as a remote control device for the television. In this way the television manufacturer, would not need to manufacture a specific remote control device for their product but could utilise a generic card reading device in conjunction with their specific smart card.

However, this concept is limiting because the control data in the smart card for the machine to be controlled comes from the machine manufacturer and thus is limited in its application.

DISCLOSURE OF THE INVENTION

According to a first aspect of the invention, there is provided a user programmable electronic card interface system for programming an electronic card having a substrate and an memory carried by said substrate; said system comprising an electronic card writer having a receptacle shaped to receive said electronic card and data means to write data to said memory; and a user terminal including processor means, display means and data input means, said user terminal communicating with said electronic card writer, wherein a user can enter customised data into said user terminal via said data input means, write said customised data into said memory via said electronic card writer, wherein said customised data is adapted to control a function of equipment when said customised data is communicated to said equipment.

According to a second aspect of the invention, there is provided an electronic card interface system, said system comprising: an electronic card having a substrate and an electronic memory carried by said substrate, wherein the electronic card has been programmed by a user by storing data in said memory to control data controlled equipment; an electronic card reader having a receptacle shaped to receive said electronic card and data means to read said data from said memory; and a said data controlled equipment having a function controlled by receipt of said data and communicating with said electronic card reader to receive said data therefrom.

According to a third aspect of the present invention, there is provided a smart card reader having a touch sensitive substantially transparent screen through which a smart card received therein can be viewed, and an adjacent layer of selective opacity, said layer being switchable between a substantially transparent state and a substantially opaque state, and being positioned relative to said screen to permit said card to be viewed through said screen when said layer is in its substantially transparent state and to occlude at least part of said card when said layer is in its substantially opaque state.

According to a fourth aspect of the present invention, there is provided a smart card indexing apparatus comprising:

a smart card storage means adapted to receive a plurality of smart cards;

a smart card reader means adapted to read data from any smart card located in the storage means;

a search engine means whereby a user can specify at least one smart card parameter; and a control means responsive to the data read by the smart card reader and adapted to identify a smart card dependent upon the specified parameter.

According to a fifth aspect of the present invention, there is provided a smart card having a plurality of functions selectable by the touch of a user on an operative surface of the card, wherein said operative surface is provided with a like plurality of user customised tactile indicia each of which corresponds to one of said functions.

According to a sixth aspect of the present invention, there is provided a method of user customising a smart card having a plurality of functions selectable by the touch of a user on an operative surface of the card, said method comprising the step of providing a like plurality of user customised tactile indicia each of which corresponds to one of said functions.

According to a seventh aspect of the present invention, there is provided a programmable memory card including a user interface on a surface of said card, said interface comprising at least a region intended to receive a stimulus from a user, said region being associated with a feedback signal and an action signal.

According to a eighth aspect of the present invention, there is provided a method of gaining access to a service over a network, said method comprising the steps of: providing a customised electronic card having at least memory storage means on the card, wherein said customised card includes a functional user interface on the card and electronic data associated with the user interface stored on the storage means; providing an electronic card reader in communication with a network, the electronic card reader being capable of reading said card and providing user access to the user interface on the card; and operating said user interface to communicate the associated data to thereby gain access to a service over the network.

BRIEF DESCRIPTION OF THE DRAWINGS

Preferred embodiments of the invention will now be described, by way of example only, with reference to the accompanying drawings, in which:

FIG. 13 is a schematic perspective view of an associated telephone device and controller;

DETAILED DESCRIPTION INCLUDING BEST MODE

Figure 1:
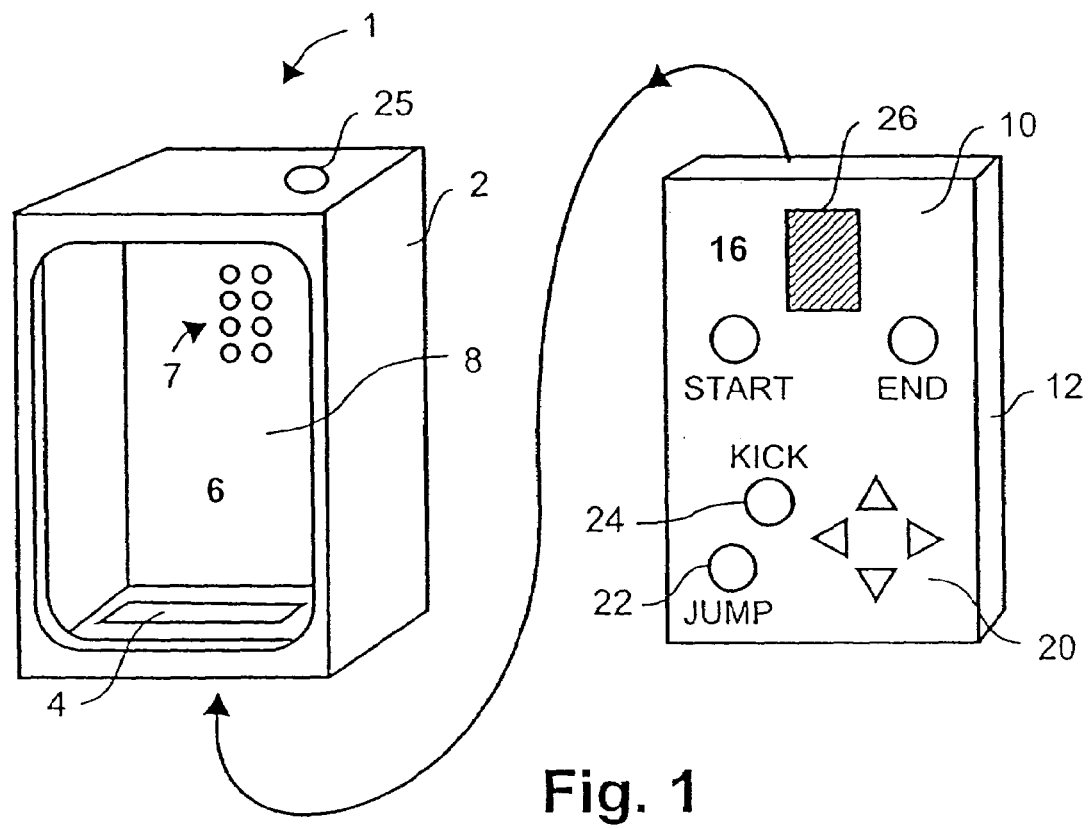
FIG. 1 is a perspective view of a controller and associated control template. according to a first embodiment of the invention.

Referring to FIG. 1, there is provided a controller 1, having a housing 2 which defines a control template receptacle 4 and a viewing area 6. Data reading means are provided in the form of exposed contacts 7 and associated control circuitry (not shown). The controller 1 also includes sensor means in the form of a substantially transparent pressure sensitive membrane 8 covering the viewing area 6.

Figure 2:
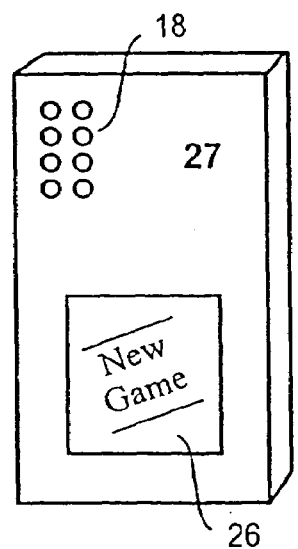
FIG. 2 is a perspective view of an opposite side of the control template shown in FIG. 1.
Figure 3:
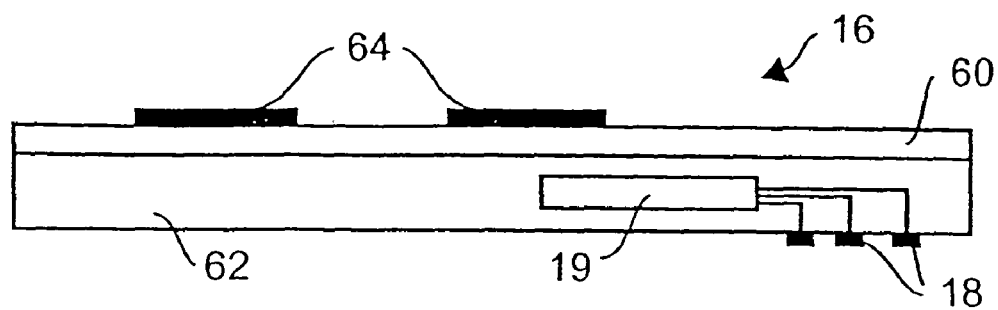
FIG. 3 is a longitudinal cross-sectional view of the control template shown in FIG. 1.

The controller 1 is configured for use with a control template, which, in the embodiment shown in FIGS. 1 to 3, takes the form of a smart card 10. The smart card 10 includes a laminar substrate 12 with control indicia in the form of a four way directional controller 20, "jump" button 22 and "kick" button 24 printed on an upper face 16 thereof. Other non-control indicia, such as promotional or instructional material, can be printed alongside the control indicia (for example, advertising material 26 on smart card 10) or on a reverse face 27 of the card (FIG. 2).

The smart card 10 includes storage means in the form of an on-board memory chip 19 (FIG. 3) for storing mapping data associated with the control indicia. The smart card 10 also includes data contacts 18 connected to the on-board memory chip 19 corresponding with the exposed contacts 7 on the controller 1.

An adhesive label 60 has printed upon it a number of control indicia 64 and is affixed to the laminar substrate 62. By using this arrangement, a home user can print a suitable label for use with a particular control template by using a printer, such as a colour BUBBLE JET (Registered Trade Mark) printer manufactured by Canon, Inc.

In use, the smart card 10 is inserted into the control template receptacle 4, such that the pressure sensitive membrane 8 covers the upper face 16 of the smart card 10. The control indicia are visible within the viewing area 6 through the transparent pressure sensitive membrane 8.

The exposed contacts 7 and associated circuitry are configured to read the 10 mapping data associated with the control indicia from the memory chip 19, either automatically upon insertion of the smart card 10 into the control template receptacle 4, or selectively in response to a signal from the controller 1. This signal can, for example, be transmitted to the smart card 10 via the exposed contacts 7 and data contacts 18.

Once the mapping data associated with the control indicia 14 has been read, a user can press areas of the pressure sensitive membrane 8 on or adjacent the underlying control indicia. By sensing the pressure on the pressure sensitive membrane 8 and referring to the mapping data, the controller 1 can deduce which of the control indicia the user has pressed. For example, if the user places pressure on the pressure sensitive membrane 8 adjacent the "kick" button 24, the controller 1 will assess the position at which the pressure was applied, refer to the mapping data, and determine that the "kick" button 24 was selected. This information can then be used to control a game running on an associated video game console (of conventional construction and not shown).

In a preferred form, the controller includes a transmitter (of conventional type and not shown), such as an infra-red (IR) transmitter or radio frequency (RF) transmitter, for transmitting information in relation to buttons selected by the user. In the embodiment of the controller 1 shown in FIG. 1, an IR transmitter having an IR light emitting diode (LED) 25 is provided. Upon selection of one of the control indicia 20, 22, 24, 64, the controller 1 causes information related to the selection to be transmitted to a remote video console (not shown) where a corresponding IR receiver detects and decodes the information for use in controlling a game being played.

Any suitable transmission method can be used to communicate information from the controller 1 to the remote video game console, including direct hard-wiring. Moreover, the video console itself can incorporate a transmitter, and the controller 1 a receiver, for communication in an opposite direction to that already described. The communication from the video game console to the controller 1 can include, for example. handshaking data, setup information, or any other form of information desired to be transferred from the video game console to the controller 1.

Figures 4, 5:
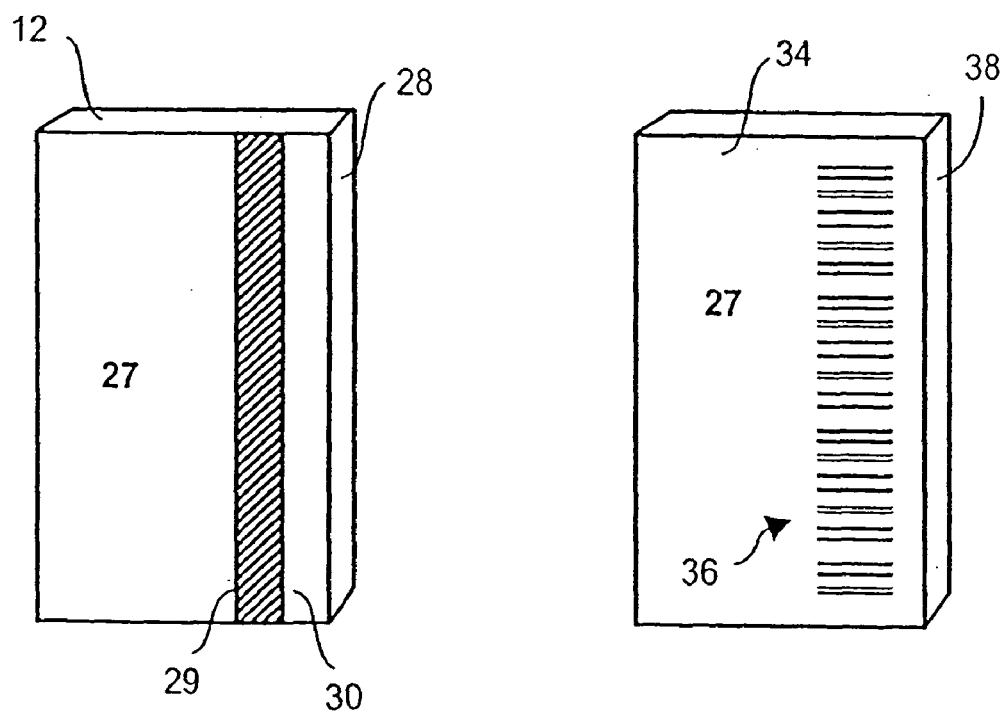
FIGS. 4 and 5 are perspective views of the rear face of alternative embodiments of the control template shown in FIG. 1.

Turning to FIG. 4, there is shown an alternative embodiment of the control template shown in FIGS. 1 and 2, taking the form of a control card 30. The control card 30 still includes a laminar substrate 12 which bears control indicia. However, the storage means in this embodiment takes the form of a magnetic strip 29 formed along an edge 28 of the reverse face 27 of the control card. The mapping data is stored on the magnetic strip 29 in a conventional manner. A corresponding controller (not shown) for this embodiment includes a magnetic read head positioned at or adjacent an entrance to the corresponding control template receptacle. As the control card 30 is slid into the control receptacle, the mapping data is automatically read from the magnetic strip 29 by the magnetic read head. The controller is then operated as described in relation to the FIG. 1 embodiment.

FIG. 5 shows another embodiment of a control template in the form of a control card 34, in which the storage means takes the form of machine readable indicia In the embodiment shown, the machine readable indicia takes the form of a barcode 36 formed along an edge 38 of the reverse face 27 of the card 34. The mapping data is suitably encoded, and then printed in the position shown. A corresponding controller (not shown) for this embodiment includes an optical read head positioned at or adjacent an entrance to the associated control template receptacle. As the card 34 is slid into the control receptacle, the mapping data is automatically read from the barcode 36 by the optical read head. Alternatively, the barcode can be scanned using a barcode reader associated with the controller immediately prior to inserting the control template, or scanned by an internal barcode reader scanner once the control template has completely been inserted. The control template is then operated as described in relation to the FIG. 1 embodiment. It will be appreciated that the position, orientation and encoding of the barcode can be altered to suit a particular application. Moreover, as will be explained hereafter, any other form of machine readable indicia can be used, including embossed machine-readable figures, printed alpha-numeric characters, punched or otherwise formed cut outs or even optical or magneto optical indicia.

Figure 6:
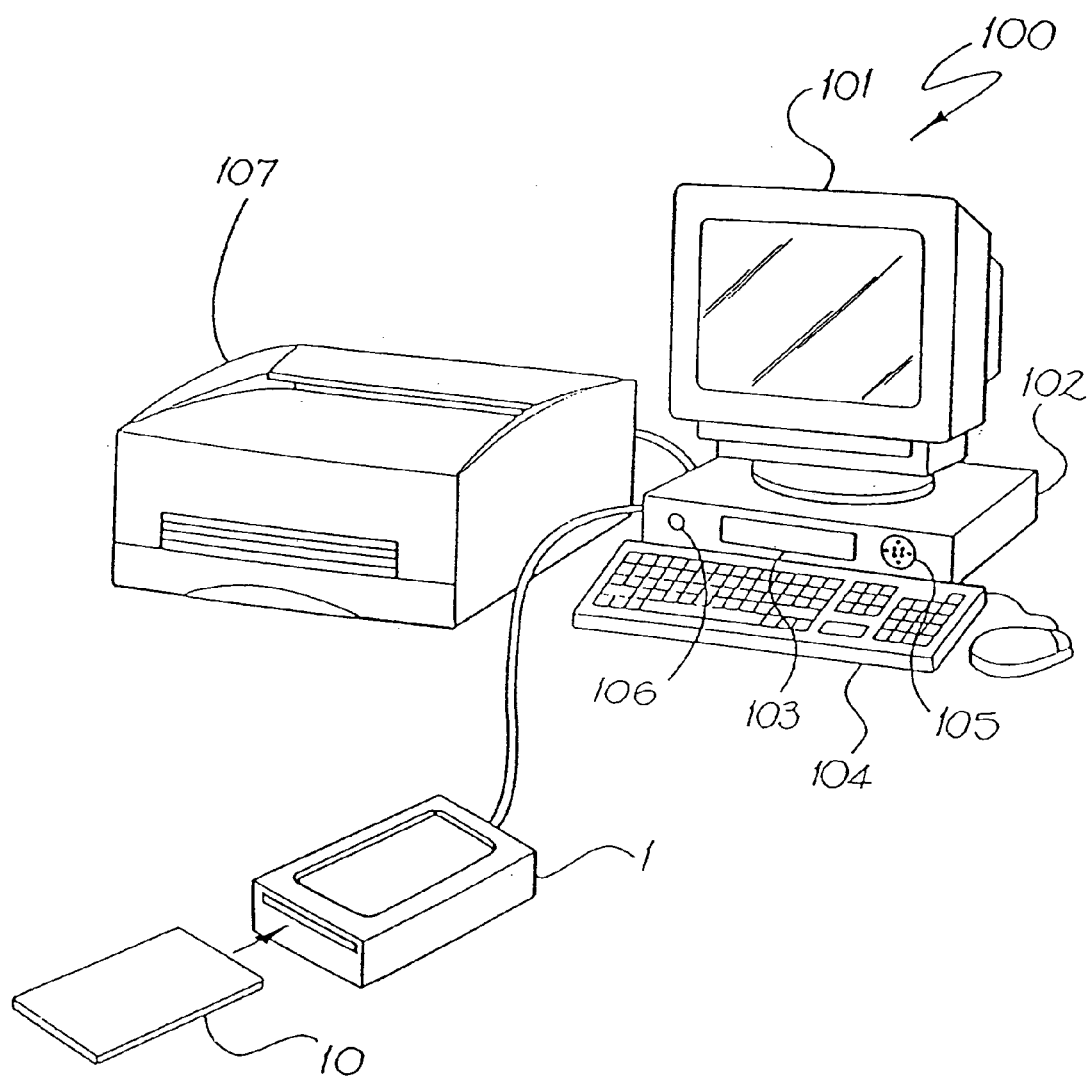
FIG. 6 is a schematic perspective view of associated display and computing apparatus.

As shown in FIG. 6, the controller 1 can also be hardwired to a display device 100 with computing power. Such a device 100 includes a screen 101, a personal computer 102, and, if desired, a memory device receptacle such as a video recording nacelle 103. The nacelle 103, and screen 101 under the control of the computer 102 functions as a video cassette recorder (VCR). Preferably a keyboard 104 and loudspeaker 105 are also provided. Instead of being hardwired, an IR transceiver 106 can also be included to communicate with the equivalent device 25 (FIG. 1) of the controller 1. A printer 107 is also provided.

The preferred control template comprises a programmable smart card which can be customizable by a third party (viz a party other than the manufacturer of the card and/or card reader). The third party may be the ultimate user of the card itself, or may be an intermediary between the manufacturer and user. In one application, the smart card is programmed and customized for one touch operation to obtain a service over a network. Examples of services over the network include those services described herein after with reference to the various embodiments. In another application, the smart card may be programmed for obtaining a service locally at a set top box. In a still further applications, the smart card can be programmed for obtaining a service both remotely and locally. For instance, the smart card may be programmed to retrieve an application remotely from a network and load it on a set top box. The latter smart card may be additionally programmed to obtain a service from the loaded application on the set top box. Various embodiments of the smart card are shown in FIGS. 7 to 17. The programming process of the smart card is described in more detail below with reference to FIG. 20.

Figure 7:
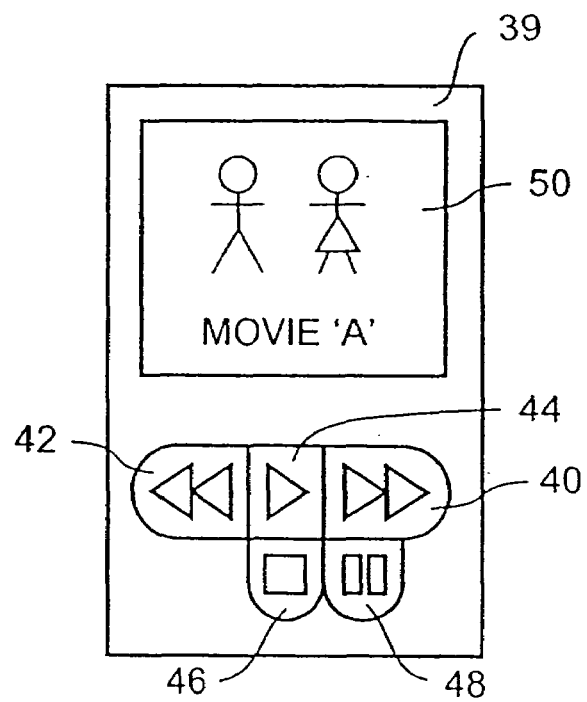
FIGS. 7 to 12 are plan views of alternative embodiments of the control template shown in FIG. 1.

FIG. 7, for example, shows an arrangement of control indicia on a control card 39 for use in controlling a video recorder. The control indicia includes "Fast Forward" 40, "Rewind" 42, "Play" 44, "Stop" 46 and "Pause" 48 buttons. Advertising material 50 is printed above the control indicia. Depending upon the mode in which the control card 39 is designed to operate, the advertising material 50 can simply be a passive indicator of the control card's intended use. By using the control card 39 with the controller 1 of FIG. 6, manipulating the various video controls printed on the card will result in playback on the screen 101 of a video corresponding to the advertising material 50. For example, if the advertising material 50 relates to a movie, manipulating the controls will playback and otherwise control that particular movie through the device 100 which functions as a video reproduction apparatus. In this embodiment, the card can be supplied with a bought or rented video movie. Alternatively, the movie can be accessed from a cable, satellite or other pay-per-view television arrangement. In the latter case, distribution of the card as a marketing tool can increase viewer interest in particular movies. It will be appreciated that this embodiment can be adapted for any pay-per-use arrangement Alternatively the control indicia can be used to control the video reproduction apparatus in a known way. For example, pressing "Play" 44 results in the replay of whichever movie is presently loaded into the device 100 associated with the controller 1. In this mode, the advertising material 50 can represent a passive marketing image having no relationship to the controls themselves or the video to be replayed and otherwise manipulated by the control indicia.

Alternatively, the storage means associated with the control template can store mapping data associated with the advertising material 50. By "pressing" the pressure sensitive membrane 8 on or adjacent the advertising material 50, a user can instigate playback on the video reproduction device 100 of marketing imagery associated with the advertising material 50. For example, in one embodiment, the advertising material 50 is related to a movie 'A', and is bundled with a recorded video medium such as a video cassette or DVD containing a movie 'B'. Once the recorded video medium is positioned within the playback device 100, the control template 39 is inserted into the controller 1. Upon pressing "Play" 44, Movie 'B' is played back through the device 100. Playback is controlled using the various control indicia on the card. However, at any time, pressing the advertising material 50 causes a preview of movie 'B' to be played via the device 100. It will be appreciated that the preview of movie 'B' is actually stored on the same recorded video medium as movie 'A', and that the advertising material simply represents a link thereto. It will also be appreciated that in alternative embodiments the recorded advertising material can be stored on the control card 39 itself, or even in storage facilities not included on the card but accessible to the device 100. In one embodiment, the remote storage facilities are accessible via a computer network, such as the internet.

Figure 8:
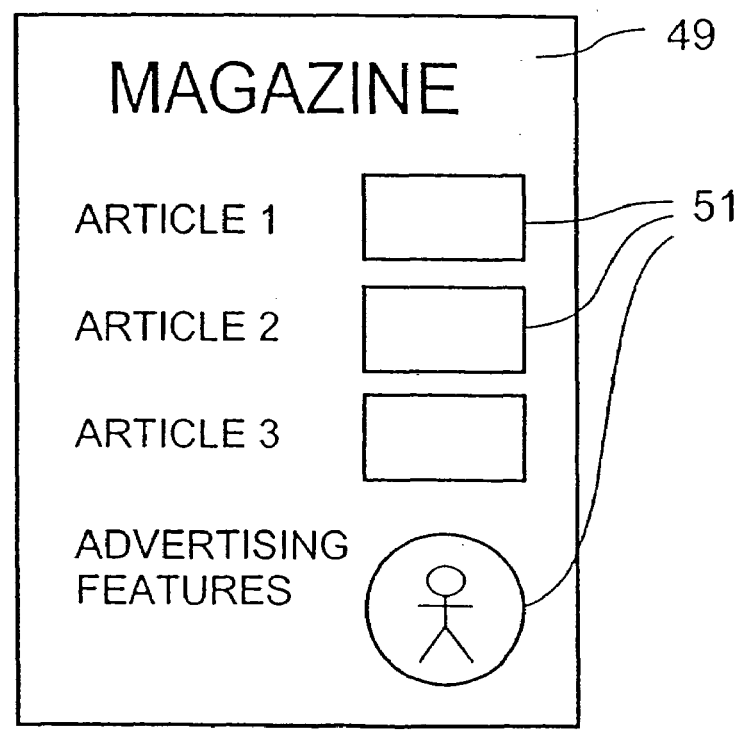

FIG. 8 shows an alternative control template 49 which represents a magazine, the contents of which can be "browsed" using the control indicia. Along with the mapping data, the "on-card" storage means (19 of FIG. 3) includes magazine content data such as text, images, and multimedia content such as sound, video and animation. Various icons 51 link with corresponding portions of magazine data, which, when selected, are reproduced via the device 100. As with the previous embodiment, some or all of the magazine content can be stored in a remote location accessible via a communications or computer network, such as the internet. In this case, it will be usual for the control card 49 to incorporate security access features, which allow the user of the control card 49 to access the required material whilst preventing general access via an unauthorised internet browser or the like. This ensures that the person accessing the material has the right to access the data by having purchased or otherwise legitimately obtained the requisite control card 49.

Figure 9:
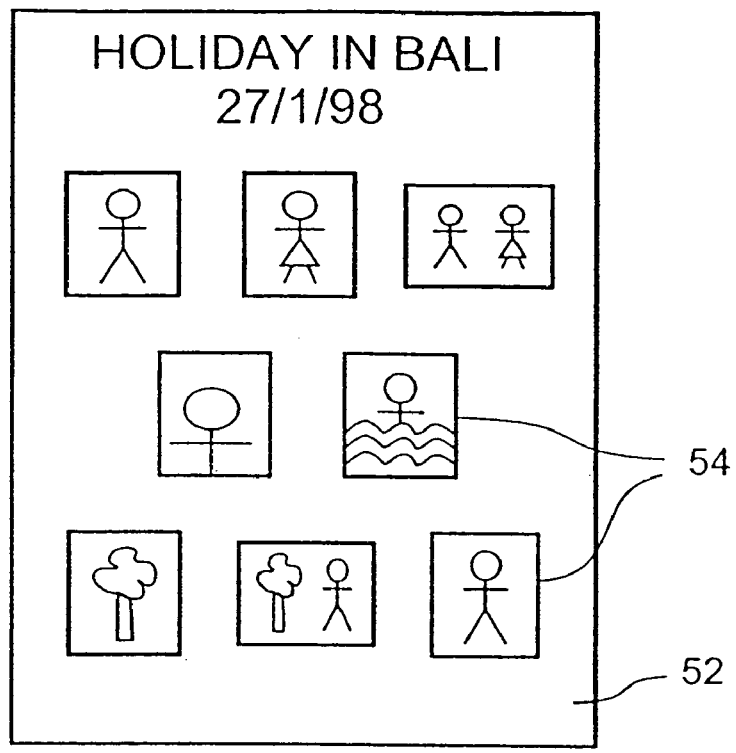

Turning to FIG. 9, there is shown an alternative embodiment control template in the form of a table of contents card 52. The table of contents card 52 is a summary card for a virtual photo album, or for a series of photographs or images stored on the card, in a remote storage location or on an image storage medium such as a CD-ROM or DVD disc. The summary appears as a series of thumbnails 54 representing larger, higher resolution versions of the photographs or images. By positioning the table of contents card 52 into the controller 1 and pressing any one of the thumbnails 54 results in the larger, higher resolution version of the image or photograph being displayed on the screen 101.

In one embodiment, the table of contents card 52 is supplied when a user deposits photographic film for development. Once the film is developed, the resultant images are digitised and stored on a digital storage medium, such as a CD-ROM or DVD disc. A corresponding table of contents card 52 is then generated and given to the user with the digital storage medium. Alternatively, the digitised images can be stored at a remote site, for access by the user via a computer network such as the internet. In this case, the user is simply supplied with the table of contents 52, which is taken home and inserted into the controller 1. Selecting a particular thumbnail causes the corresponding high resolution image to be downloaded via the internet to the computer 102 and displayed on the screen 101 for viewing by the user.

In other embodiments, each thumbnail 54 represents a sequence of images, or a particular point in a series of sequential video frames. An example of where this might be used is in a video recording, wherein the first frame of each tale is automatically recorded for later review. By producing a table of contents card 52 with a still image 54 of the first frame of each of the takes on it, a director or editor can quickly move the display device 100 between different takes without having to use cumbersome manual fastforward or rewind buttons. In this embodiment, it is necessary for the storage means 19 associated with the table of contents 52 to store mapping data associated with each of the thumbnails, and relationship data linking each thumbnail with its corresponding image or sequence of images available to the device 100.

Figure 10:
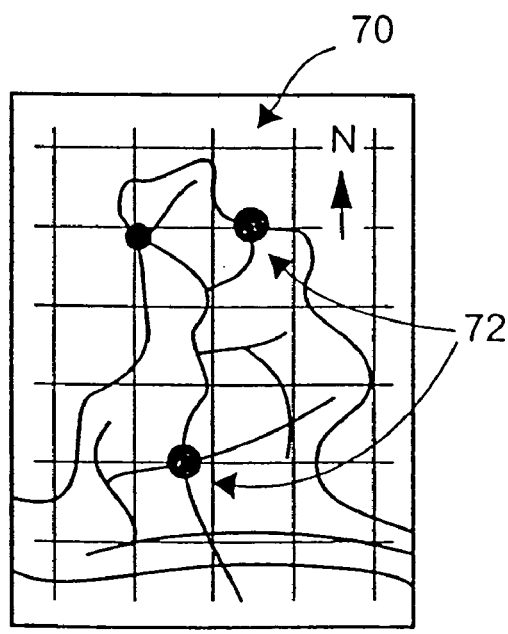

In FIG. 10, there is shown a control template in the form of a tourist information map 70 having a plurality of areas of interest 72 highlighted. Upon inserting the tourist map 70 into the controller 1, a user is able to select any one of the areas of interest 72 for which further information is required. This information can be displayed on the associated display device 100 after being retrieved either from its internal memory or from a remote memory such as a corresponding internet site.

Figure 11:
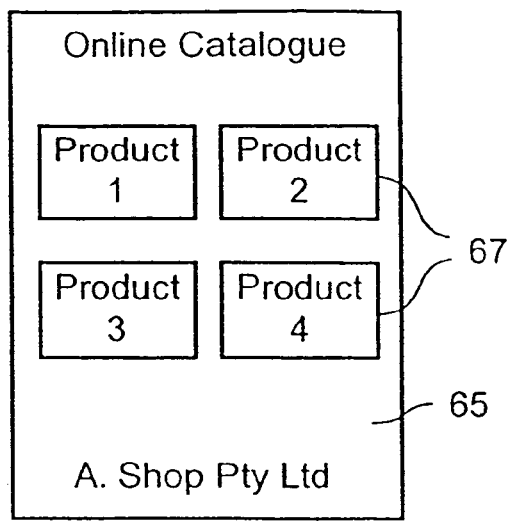

FIG. 11 shows a control template 65 configured for use as a catalogue or advertising brochure, which can be delivered to post boxes, or distributed with magazines, videos or the like. By sliding the control template 65 into the controller 1, the various; control indicia in the form of control icons 67 can be selected. Each of the control icons 67 is associated with a particular product, and pressing that icon results in information on the associated product being displayed on a screen 101. Additionally, if the user is interested in a displayed product, an option can be provided whereby the user automatically orders the product once selected. The brochure is used with the home computer system 103 which is programmed with data required to effect a transaction, such as credit card details and expiry date, personal details, and the address to which to send the product. Of course, suitable security can be implemented requiring a user to enter a password before the various details are forwarded from the computer system. As with previous embodiments, the information can be sent via a communications network such as the internet.

Figure 12:
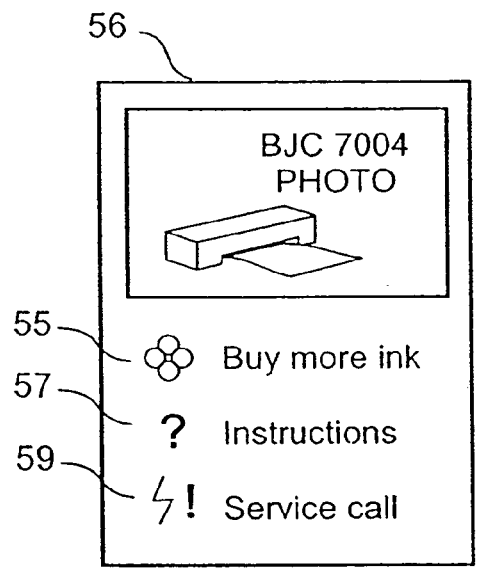

FIG. 12 shows a control template 56 for use with, in this case, a printer such as the printer 107 of FIG. 6. In the embodiment shown, the control template includes a "Buy More Ink" indicium 55, an "Instructions" indicium 57 and a "Service Call" indicium 59. With the template 56 in the controller 1, the "Buy More Ink" indicium 55, when pressed, sends a request via the computer 102 and the internet, or other communications network, to an ink supplier. In the preferred form, the request for more ink also forwards details such as the make and model of the printer, the type of ink required, the address and location of the printer within an organisation, and "bill to" data enabling an invoice to be generated.

The "Instructions" 57 indicium calls up an instructions menu on the associated display screen 101. This enables the user to then conduct a self-operated tutorial on the computer 102 via the keyboard 104.

Finally, the "Service Call" indicium 59 generates a request for service which, again, is sent via the computer 102 and the internet or a communications network to an appropriate location. The service call preferably includes data such as the printer's make and model, the address at which the printer is located and its specific floor location at that address, and a code corresponding to the printer's self-diagnosed problem.

It will be appreciated that other appliances can have different indicium for correspondingly different purposes related to the specific needs thereof.

In addition, the printer 107 can be used to print smart cards with the control indicia and also program them with the mapping (and other) data, using the computer 102. In a particularly preferred embodiment, the controller 1 is able to download data from the computer 102 and write same into a smart card in the controller 1. Thus a user can create a smart card which is printed and written to automatically. For example, the control indicia can first be printed onto an upper face of the card, and then the mapping data can be downloaded from the computer 102 to the smart card. Alternatively an adhesive label can be printed and then adhered to the smart card.

Figure 14:
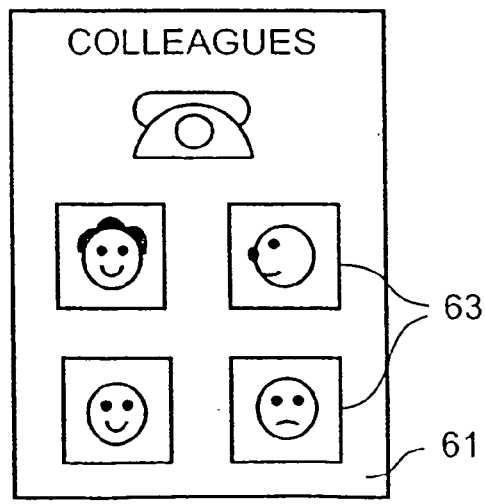
FIG. 14 is a control template for use with the apparatus shown in FIG. 13.

Turning to FIG. 13, there is shown the controller connected to a telephone 120 including a keypad 121. The controller 1 receives a smart card or a control template 61 designed for use as a personal address book. The control template 61 in this case is illustrated in FIG. 14 and includes a number of contact icons 63, each of which is linked to telephone, address, e-mail and other personal data associated with the person pictured in that icon. By inserting the control template 61 into a controller 1 associated with the telephone 120, selection of a given contact icon will enable communication with the corresponding person by dialling the corresponding telephone number. Where a number of telephone numbers, such as work, home and mobile telephone numbers, are available. selection of a contact icon 61 will cause a menu to be displayed on a visual display associated with the telephone 120, offering a choice of work, home or mobile calling. The user selects the desired option via the keypad 121, and the number is automatically called. Alternatively, if the computer 102 of FIG. 6 is being used, selection of the icon 63 will open an e-mail client program and insert the e-mail address of the intended recipient, thereby enabling the user simply to type in the e-mail message on the keyboard 104 and send it. As with previous embodiments, the contact data can be stored in or on the control template 61 itself, or can be remotely stored for access via, say, the internet. Similarly, the mapping data linking the spatial extent of each icon can remotely be stored.

Figure 15:
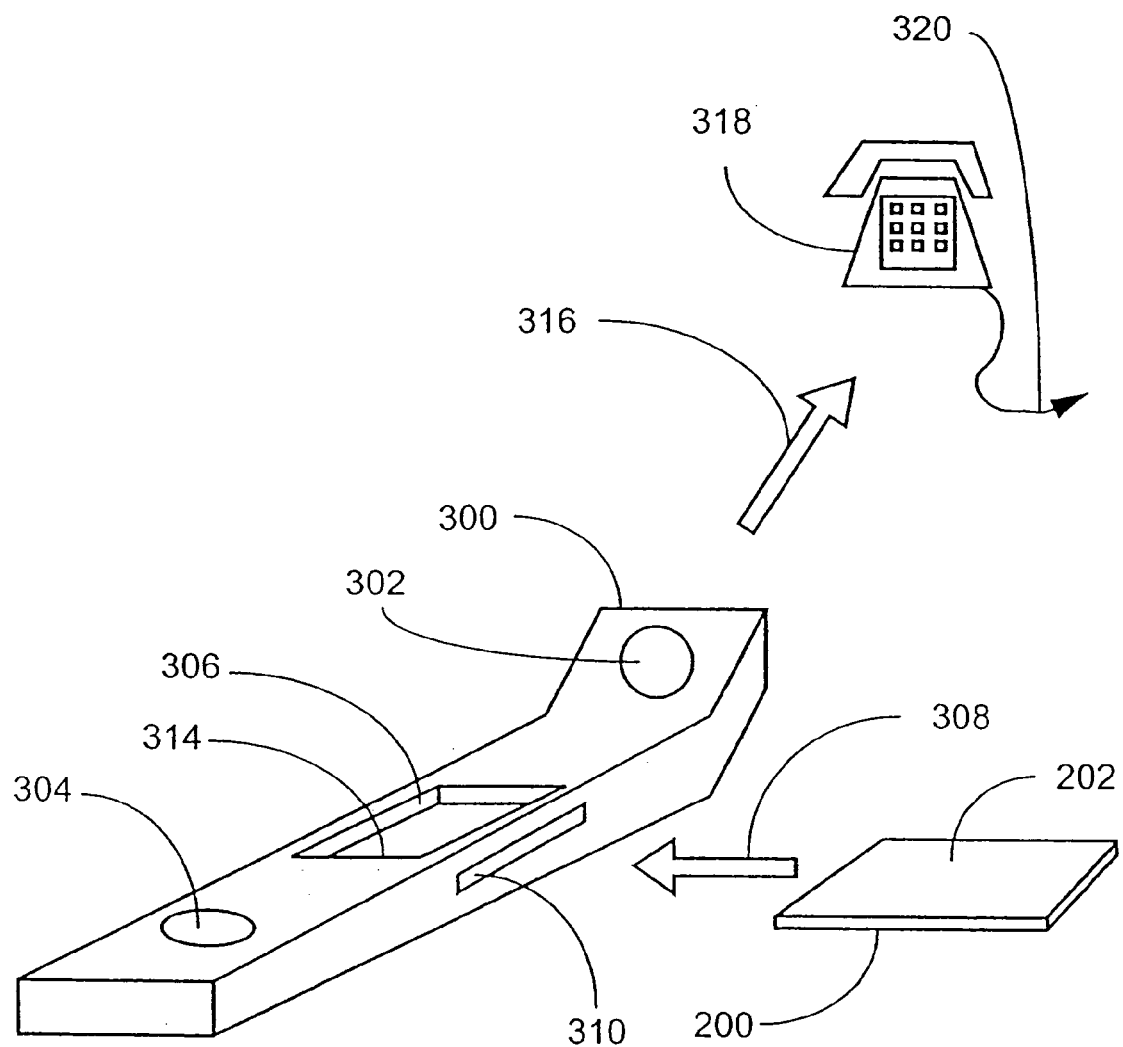
FIG. 15 represents a preferred embodiment of a cordless telephone adapted for use with a customised smart card.

FIG. 15 depicts a personal cordless telephone 300 which is able to be used in association with the smart card described in relation to FIG. 14. The telephone 300 incorporates a speaker 302, a microphone 304, and a recess 306 through which the upper surface 202 of a smart card 200 is able to be accessed by the user. The smart card 200 is inserted into the telephone 300 through a slot 310 as indicated by an arrow 308. Electrical contacts on the rear surface of the smart card 200 make electrical contact with corresponding electrical contacts 314 located in the recess 306 of the telephone 300. The cordless telephone 300 communicates by means of infrared, or alternatively radio, signals as depicted by arrow 316 with a telephone base station 318. The base station 318 is connected to the public switched telephone network (PSTN) (not shown) by means of a cord 320. A child, for example, can, by inserting the smart card 200 into the cordless telephone 300, have easy access by means of one-touch icons showing the face of a relevant person such as a mother, father and so on to each of those persons. The relevant telephone number is stored in the smart card 200 against the corresponding icon.

Figure 16:
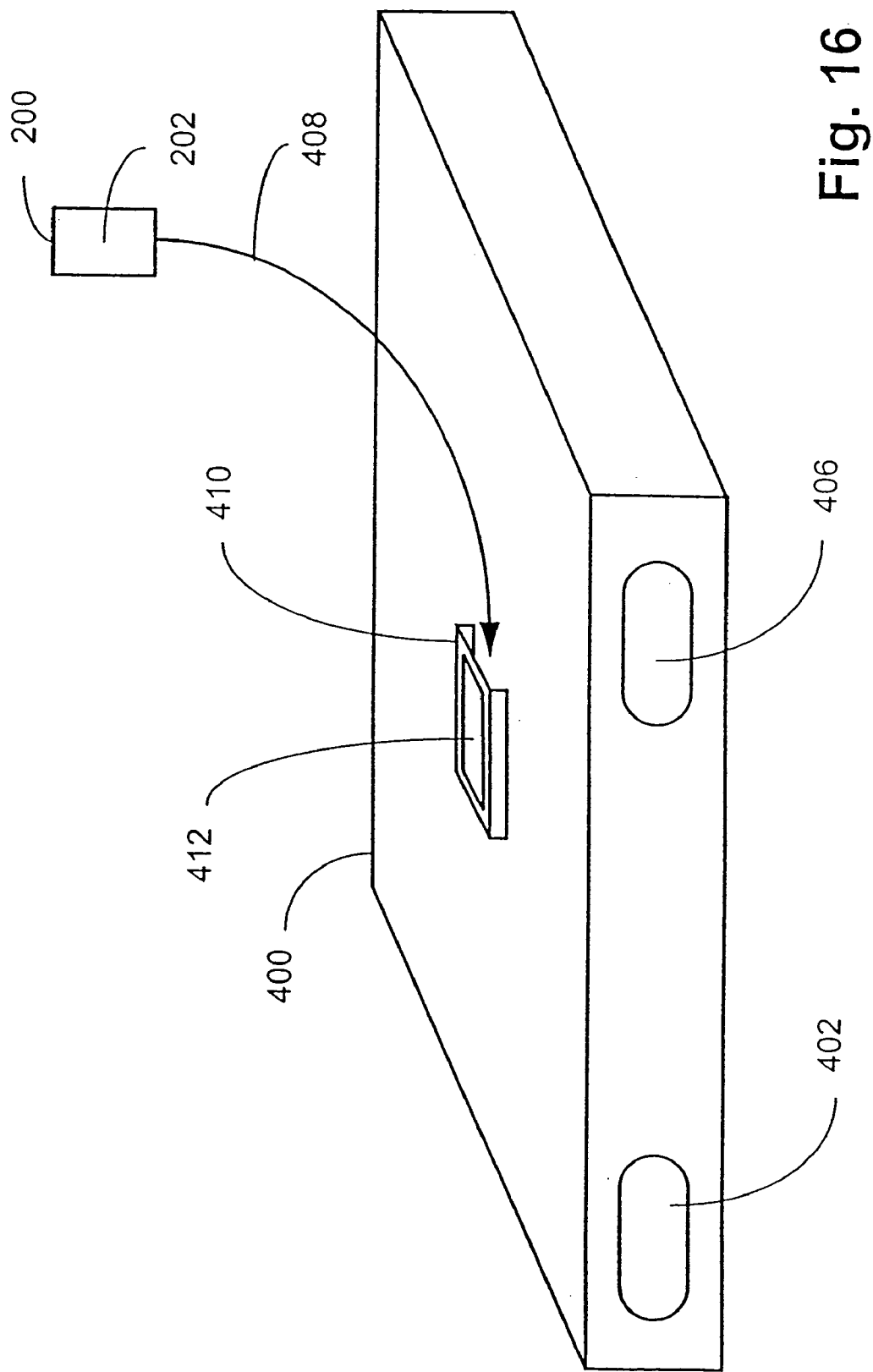
FIG. 16 depicts a preferred embodiment of a public telephone adapted for use with the aforementioned smart cards.

FIG. 16 presents an illustrative depiction of a public telephone 400 complete with a microphone 402 and a speaker 406. The public telephone 400 is not equipped with a normal keypad, however instead is fitted with a smart card receptacle 410. The smart card 200 can be inserted into the receptacle 410 as depicted by an arrow 408, thereby exposing the upper surface 202 of the smart card 200 through an aperture 412. When the child previously discussed inserts the smart card 200 as described into the telephone 400, the child has simple and uncomplicated access to the same important telephone numbers as was the case with the cordless telephone 300, which would be used in his home.

There is a problem which arises in relation to smart cards in that there is no "keyboard feedback" to the user. With a conventional keyboard, the movement of the pressed key provides the user with a generally reliable indication that the key has been effectively pressed. However, with a touch sensitive screen or capacitive sensing, there is no equivalent movement.

Further, particularly in relation to smart cards where the user stimulated region operates an interface procedure, two additional problems arise. The first of these is that no change in a screen display, for example, may occur immediately following the successful "pressing" of an icon or region through a touch sensitive panel. This is because a computer processor may well be loading and/or executing instructions giving rise to a substantial delay.

Secondly, pressing the same icon or region twice in succession often leads to a further, and different, set of instructions being issued. Thus, if the user should press the touch sensitive panel twice in error, because the user (erroneously) thinks the first press was ineffective, then the consequences are far more damaging then during, say, typing, where the result is merely a given character being repeated twice. Particularly during electronic funds transfer, purchasing transactions, etc., every effort should be made to prevent the unintended set of second instructions beings issued in error.

Figure 17:
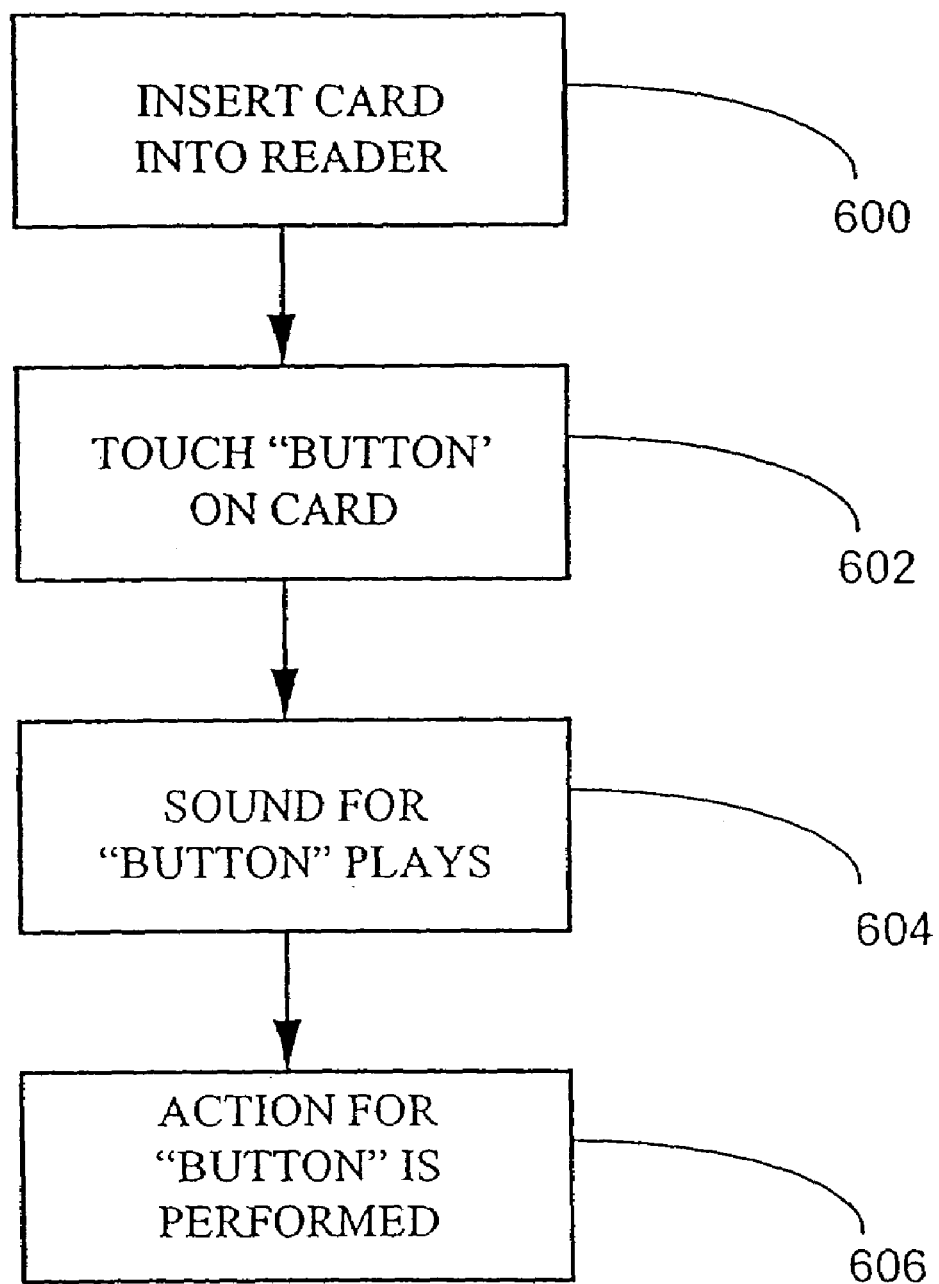
FIG. 17 presents a process flow diagram of a preferred embodiment from the user perspective.

FIG. 17 presents a process flow diagram for operation of a smart card user interface presented from a user perspective. A user inserts a smart card into an appropriate reader in process step 600, and touches a "button", or an "icon", or a "region" as described previously, at a designated position on the card in process step 602. In this instance, the smart card, and card reader are appropriately equipped so that the keystroke described in the process step 602 results in a sound being emitted (eg by the telephone speaker) in process step 604. The sound which is emitted is characteristic of the particular button which was pressed in the process step 602, and represents a form of feedback cue by which the user call verify that a particular icon or region has been pressed. Preferably, each button or icon has a different sound. For example, an icon which when activated results in a purchase can have a sound of coins falling down a chute, an icon which when activated results in opening a new program can have the sound of a squeaky door opening, etc. The process step 602 is optional and may be omitted if desired.

Finally, in step 606 an action associated with the particular icon or region being pressed is performed. Thus for example, having reference to the "telephone smart card" 200 described in relation to FIGS. 15 and 16, the sound emitted in process step 604 when the region 204 associated with the child's mother is pressed, might be a particular jingle associated with the child's mother, or alternatively, a synthesised voice output presenting is the word "Mother" or "Mom". In this instance, the action associated with process step 606 is to establish a telephone call to the child's mother at the appropriate number associated with the aforementioned region 202.

Figure 18A:
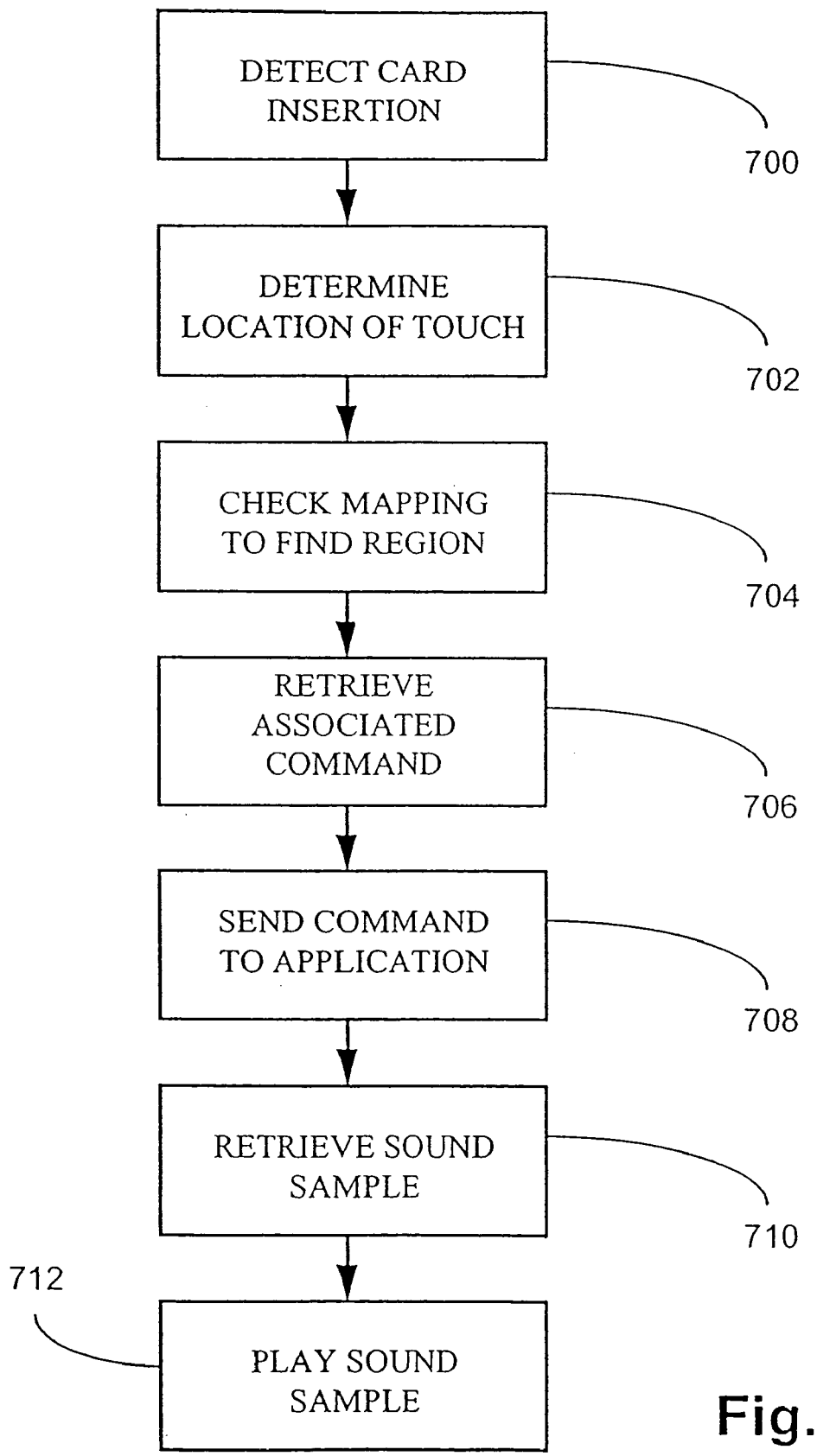
FIG. 18A presents a process flow diagram of a preferred embodiment from the card reader perspective.

FIG. 18A presents a process flow diagram from the perspective of the card reader into which a smart card as described is inserted. In a process step 700 the card insertion is detected, whereafter in a process step 702, the card reader detects that the user has touched one of the designated regions. In the initial detection step 700, the card reader retrieves from the smart card memory, the name and address of the application associated with the card. In the following process step 704, the card reader makes reference to mapping information in order to identify the particular region pressed by the user, whereafter in step 706 the command associated with the particular region in question is retrieved from a memory. In a process step 708, the particular command being requested through touching the specified region is sent to the application in question. In the present case, and making reference to the child's telephone interface previously discussed, the command would be "to establish a telephone connection with the child's Mother", and the application in question would be a telephony communications application. In the following process step 710, the feedback sound associated with the particular region in question is retrieved, whereafter it is played in step 712 to the user. The process steps 710 and 712 are optional and may be omitted if so desired.

The smart card as described has stored in its memory a list of x-y coordinates and commands associated with the "buttons", "icons", and/or "regions" of the smart card. For instance, each member of the list may have the syntax {TL,BR, "COMMAND" }, where TL and BR are the x-y coordinates of the top left hand corner and bottom right hand corner respectively of the associated "button", "icon" or "region" on the smart card, and where "COMMAND" is the associated command to be performed by pressing the associated "button", "icon", or "region". Some examples of "COMMAND" may be load URL address, or down load file etc. Preferably, the syntax allows multiple commands for each TL, BR coordinate. For instance, a member of the list may contain in addition to a command designated by the "button", a further command for retrieving and playing a particular sound sample for feedback to the user as previously described.

Figure 18B:
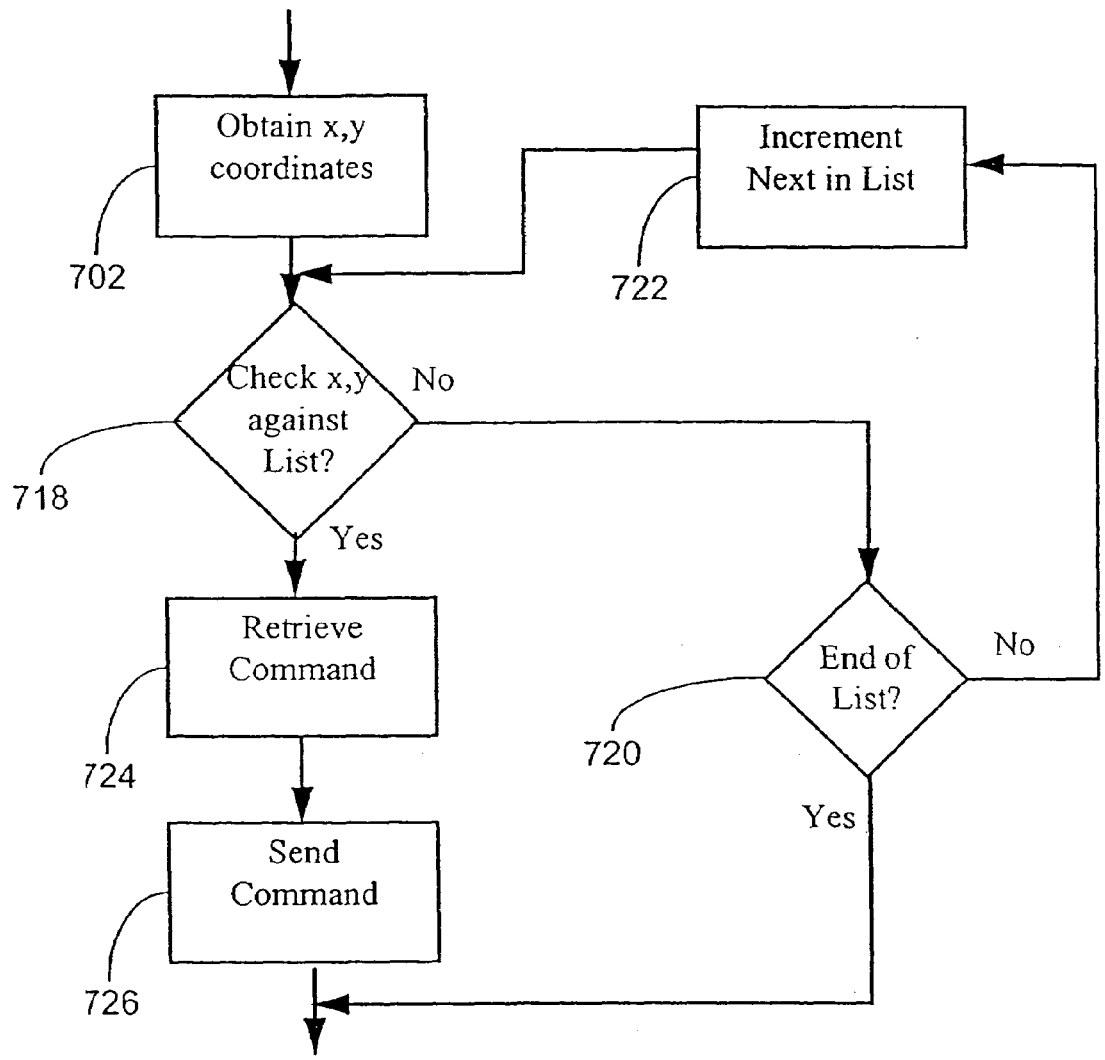
FIG. 18B presents in more detail a process flow diagram of steps 702 to 708 of the process shown in FIG. 18A.

Turning now to FIG. 18B, there is shown in more detail the processes of steps 702 to 712 of FIG. 18A In a process step 702, the card reader determines the x-y coordinates of the area on the smart card, which has been pressed by the user. The process then continues to decision block 718, where a check is made by the card reader whether these pressed x-y coordinates match the coordinates TL, BR of a first member {TL, BR, "COMMAND"} of the list, which has been retrieved from memory in the smart card. If the x-y coordinates pressed by the user do not match to the coordinates TL, BR of the first member then the decision block 718 returns false (no) and the process continues to decision block 720. In decision block 720, a check is made whether the current member of the list is the last member of the list. If the decision block 720 returns false (no) then the process continues to process step 722, where the card reader increments to the next member of the list Otherwise if the decision block 720 returns true (yes), the process then terminates awaiting further user input. The card reader, thus increments through the list, checking the TL, BR coordinates of each member against the pressed x-y coordinates until a match is found. If no match is found the process terminates.

In the event the decision block 718 returns true (yes), that is if the pressed x-y coordinates match the TL, BR coordinates of a member {TL, BR, "COMMAND"} of the list, then the process continues to process step 724. Preferably, TL and BR define a region or area on the smart card and a match is found when the x-y coordinates of the area pressed by the user fall or partly fall within the region or area defined by TL and BR. In the next process step 724, the card reader retrieves the "COMMAND" associated with the matched coordinates and then sends 726 the "COMMAND" to the particular application in question. The card reader already knows the name and address of the application from the initial detection of the card. After step 726, the process then terminates awaiting further user input.

Figure 18C:
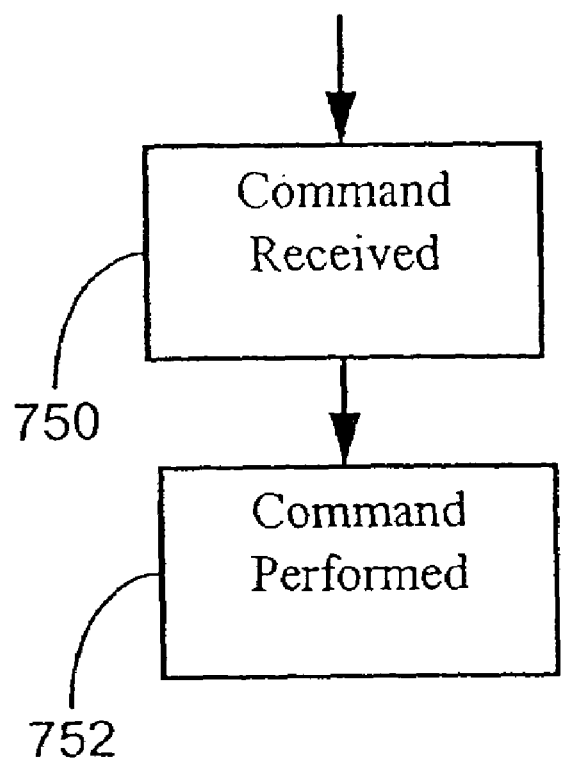
FIG. 18C presents a process flow diagram from the perspective of the application associated with a smart card as described.

FIG. 18C presents a process flow diagram from the perspective of the application associated with a smart card as described. There are many different configurations of applications suitable for use with the smart cards. For instance, the application can be located remotely on a server. Alternatively, it can also be located locally on a personal computer. The application can be a set top box, such as a VCR. Also, the application can either be implemented as software or hardware. For instance, the card reader may send a series of bits to a TV to remotely change the channels. Turning now to FIG. 18C, the process of the application is described. In a process step 750, the application receives a "COMMAND" from the card reader corresponding to the "icon", "button" or "region" on the smart card pressed by the user. The application in the next process step 752, performs the "COMMAND". For instance, the application can be an internet browser and the command "load a URL address". In another example, the application can be a telephone communications package in a telephone and the command "Phone 999 9999".

Many business organisations nowadays have interactive voice response (IVR) systems. The calling party is effectively confronted with a computerised switchboard which progresses verbally through a menu and asks the caller to press various keys on his telephone keypad in order to progressively reach the caller's desired destination. The telephone requesting of an account balance from a financial institution is an example of this activity. Particularly where the same call is frequently made, the user being required to step through a menu of options prior to reaching an intended call destination, is particularly tiresome.

To alleviate this problem it is possible for the user to program his smart card with the desired series of telephone number, pauses, numerical menu responses, and account numbers and even passwords. This activating a single icon (labelled $ for example) can remove all the tiresome telephone key pressing and deliver the desired account balance in a single operation.

Figure 19:
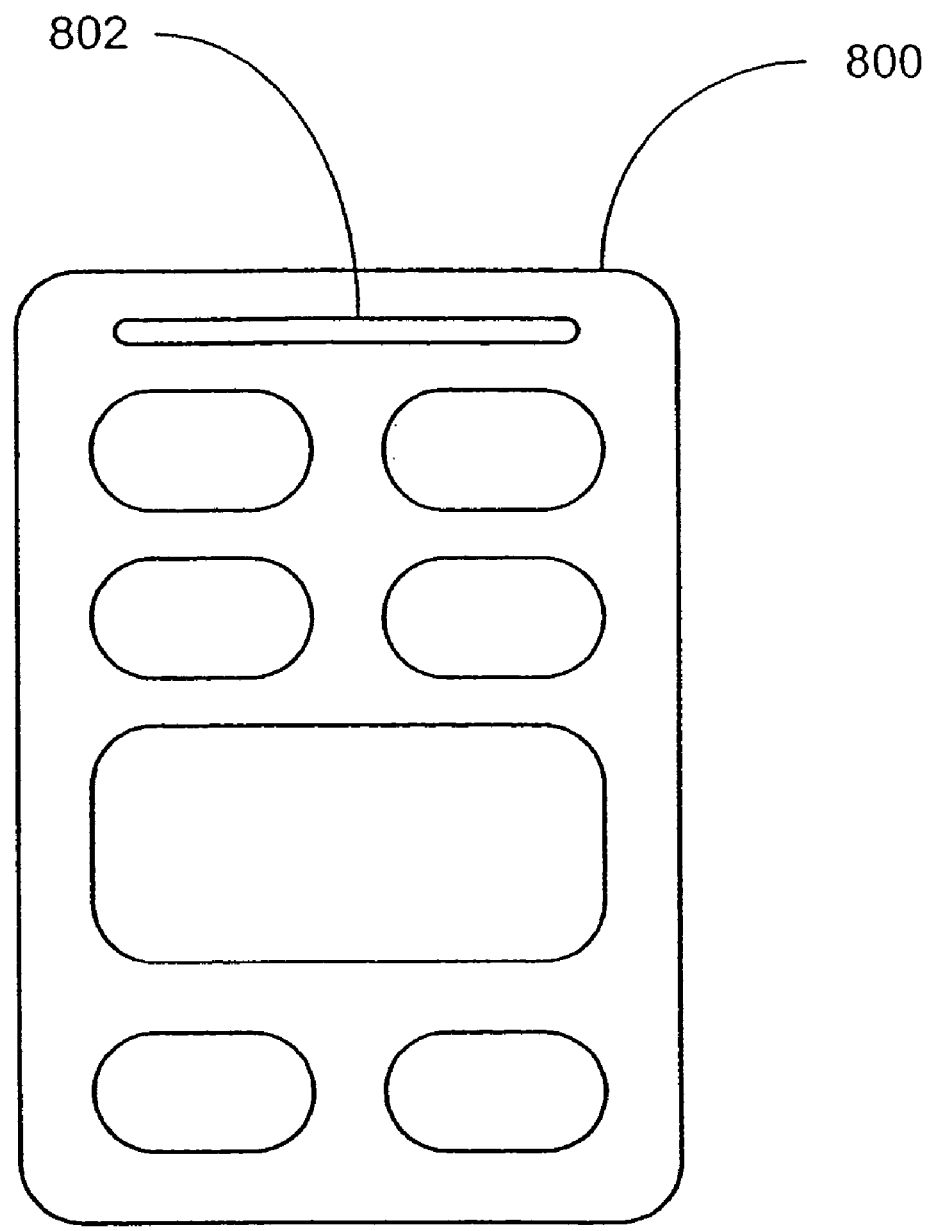
FIG. 19 depicts local visual feedback on the surface of a smart card.

FIG. 19 indicates how the feedback signal is able to be a visible feedback signal instead of being an audio signal as previously described in relation to FIGS. 16 and 17. A flashing light emitting diode (LED) 802 is located directly on the upper surface of a smart card 800. Alternatively, the LED 802 can be located on the cordless telephone 300 (see FIG. 15), or on the public telephone 400 (see FIG. 16).

Figure 20:
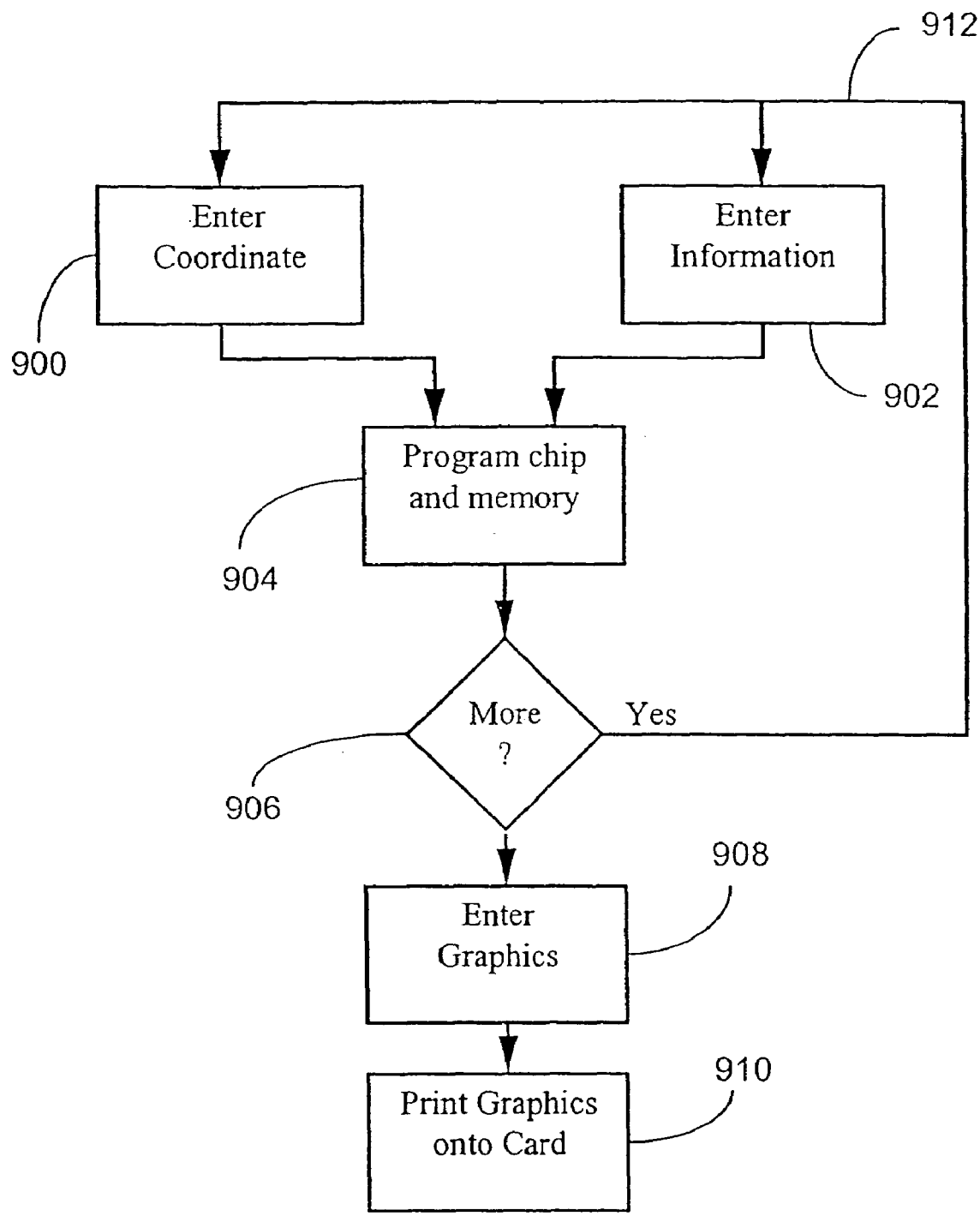
FIG. 20 presents a process flowchart for a preferred embodiment of a programming/printing apparatus.

Given the wide range of applications to which the programmable smart card interface is able to be applied, and the almost infinite range of data associated with the applications, a means of programming the required data into a smart card is required, and a process flowchart in this regard is presented in FIG. 20.

Figure 38:
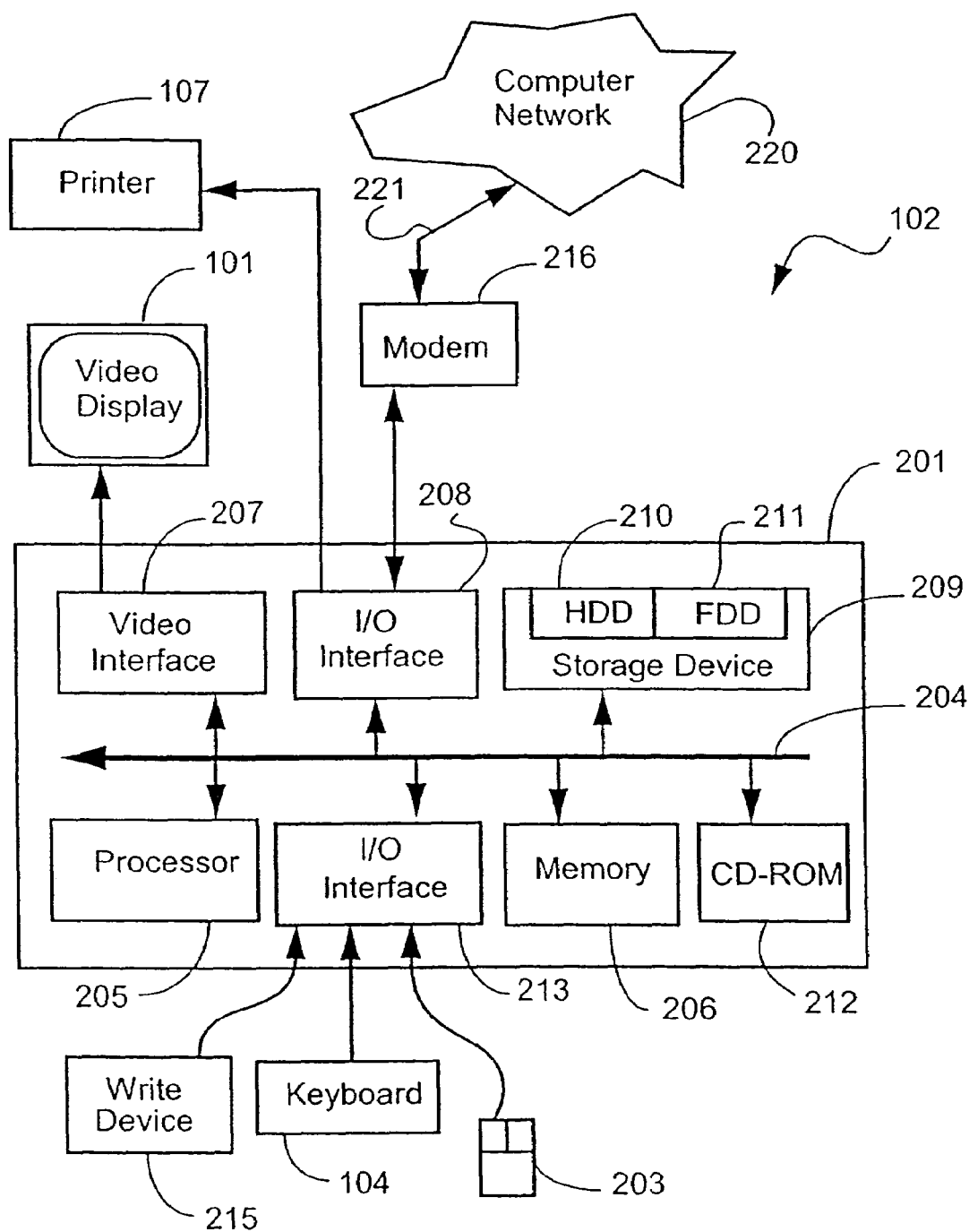
FIG. 38 is a schematic block diagram of a general purpose computer useful in putting some embodiments of the present invention into practice.

Turning to FIG. 38, there is shown a general-purpose computer 102, which is used for programming the smart card according to the process of FIG. 20. The Smart card is programmed by means of a write device 215 coupled to an I/O interface 213 of the general-purpose computer 102. The write device 215 has the capability of writing data to the memory on the smart card. In addition, the write device 215 has the capability of printing graphics on the top surface of the smart card. The write device 215 can also have a function reading data from the memory on the smart card. Initially, the user inserts the smart card into the write device 215. The user then enters the required data via the keyboard 104 of the general-purpose computer 102 and a software application writes this data to the smart card memory via the write device 215.

Returning to FIG. 20, the programming process is now described. In process step 900 coordinates for a specified region is entered, while in parallel (or alternatively sequentially) information associated with the region in question is entered in process step 902. Again making reference to the child's telephone card 200, the coordinates of a button, icon or region are x-y coordinate measurements measured from convenient points, say a top left hand corner and bottom right corner of the card, while the command information associated with the button, icon or region is the telephone number for the child's mother at her place of work. Once both these pieces of information are entered via the keyboard 104, they are loaded by the software via write device 215 into the smart card memory in step 904. This information is stored in the smart card memory as a member of a list, eg {TL, BR, "COMMAND"} as previously described. Thereafter in step 906, the programming process tests whether further information is to be programmed onto the card. In the event that further information is required, the programming process is directed back to process step 900 and 902 as shown by arrow 912. In the event, however, that the programming is complete, the programming process is directed to a process step 908, where the programmer is able to select appropriate graphics from the software application, where the programmer is able to select appropriate graphics from the software application. These graphics are printed by means of the write device 215 onto the smart card upper surface. The write device 215 uses the x-y coordinate measurements entered by the user for printing the graphics at the appropriate locations. It is possible to make use of more complex graphics, and for example a miniature picture of the child's Mother can be printed on the card 200.

Figure 21:
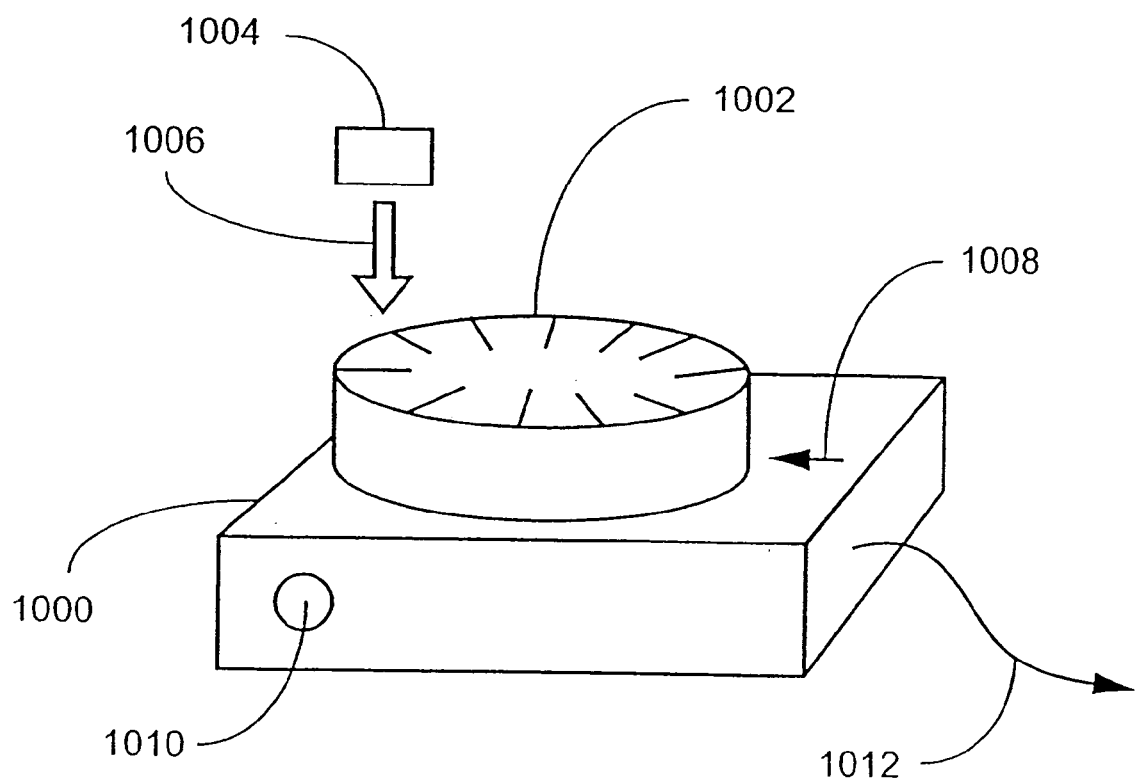
FIG. 21 depicts a preferred embodiment of an indexing apparatus for control of smart cards.

An issue which is likely to arise as use of programmable customer-interface smart cards increases, is that of systematic storage of the cards, and subsequent retrieval in a simple and efficient manner of the appropriate cards. One can image that over a period of time a person could accumulate hundreds of such cards for various applications, and an efficient and simple storage and retrieval mechanism would make their ongoing use more practical. FIG. 21 depicts a storage and retrieval apparatus 1000 which is equipped with a carousel 1002 into which individual smart cards 1004 are able to be inserted and stored in slots as depicted by an arrow 1006. The apparatus 1000 is connected by means of a cord 1012 to a computing device (not shown in FIG. 21 but the computer 102 of FIG. 6 for example). The slots in the carousel 1002 are equipped with suitable contact mechanisms so that when the smart cards 1004 are inserted, the information on the smart card 1004 is accessible to the computing device. When a user wishes to retrieve a particular smart card, say 1004, the user can enter an appropriate keyword, where upon the computing device controls the indexing apparatus 1000, rotating the carousel 1002 until the appropriate smart card, say 1004, is located immediately opposite an arrow 1008 embossed on the upper surface of the apparatus 1000. Keyword searches of this type are able to be based upon any information class stored on the smart cards, including names, company designations, and so on. Alternatively, the computing device is able to accumulate and store information on most frequently used smart cards, and enable the user to retrieve smart cards on this basis.

It will be appreciated by those skilled in the art that the card readers need not have a touch sensitive membrane and in the manner of card readers 1, 306 and 410. Instead other touch detecting arrangements are able to be used. One of these is a regular array of capacitor plates formed in the base of the card reader or receptacle. Since the card is essentially an insulator, the capacitors can sense the approach of the tip of the human finger since the self capacitance of the finger tip disturbs the charge on the opposite capacitor.

Alternatively, the rear face of the smart card can be printed with conductive ink into a series of pads all set out in a regular array with each paid connected by a corresponding thin connector to a corresponding electrical contact. Again, the approach of a human finger tip against the front face of the smart card causes a change in charge at the electrode corresponding to the pad opposite the point of approach.

Figure 24:
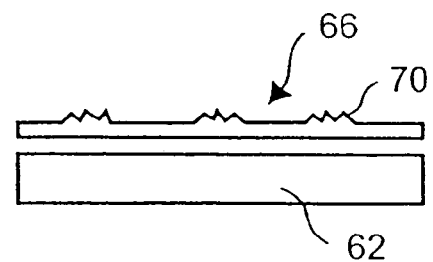
FIGS. 24 and 25 are a longitudinal section view and a perspective view respectively of an alternative embodiment of the control template shown in FIGS. 22 and 23.
Figure 23:
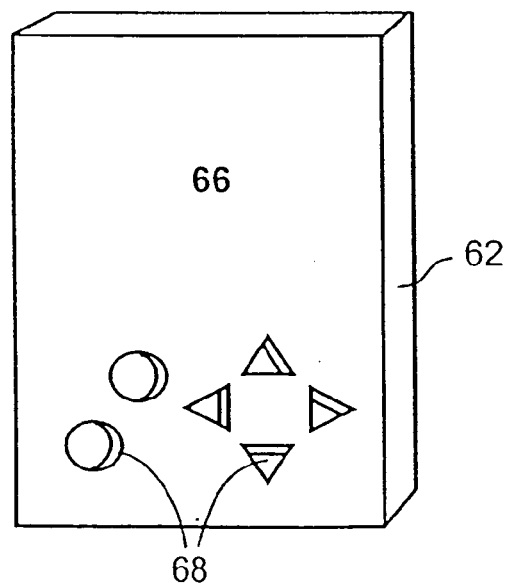
Figure 25:
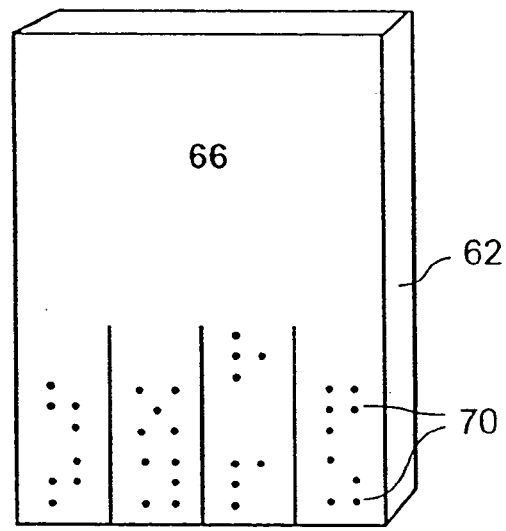

Thus, as seen in FIGS. 22–25, the smart card can have an upper surface which is not smooth. Thus in FIG. 22 the substrate 62 can be provided with an embossed upper face 66 having a plurality of raised areas 68. These provide the user with tactile feedback. If desired, as indicated in FIGS. 24 and 25, the embossed upper face 66 can be provided with Braille characters 70. However, as the number of persons who know Braille is relatively small, this limits the commercial application of this type of indicia.

However, in many commercial applications it is disadvantageous to be required to read the smart card indicia since this slows down the desired operation. For example, in browsing through a long sequence of images, only some of which are to be printed for subsequent investigation, the viewer activates either a "print" indicium or a "next" indicium depending on whether the particular image being displayed is to be printed or whether the next image in the sequence is to be displayed instead. Naturally, if it is necessary for the viewer on each occasion to look down onto the smart card itself before being able to ascertain which indicium to select, this very substantially slows the rapidity with which the viewer can view all the images in the sequence.

A similar situation arises where viewing is occurring in darkened circumstances, for example whilst watching TV, and the viewer wishes to change channels. Under these circumstances it is very disruptive to increase the level of illumination to a point where indicia on the smart card can be read to identify the required indicium to be pressed to select the desired channel.

Other scenarios will arise such as that where the operator may have good long distance sight for viewing a screen, but poor short distance sight required to view the indicia on the smart card.

Figure 26:
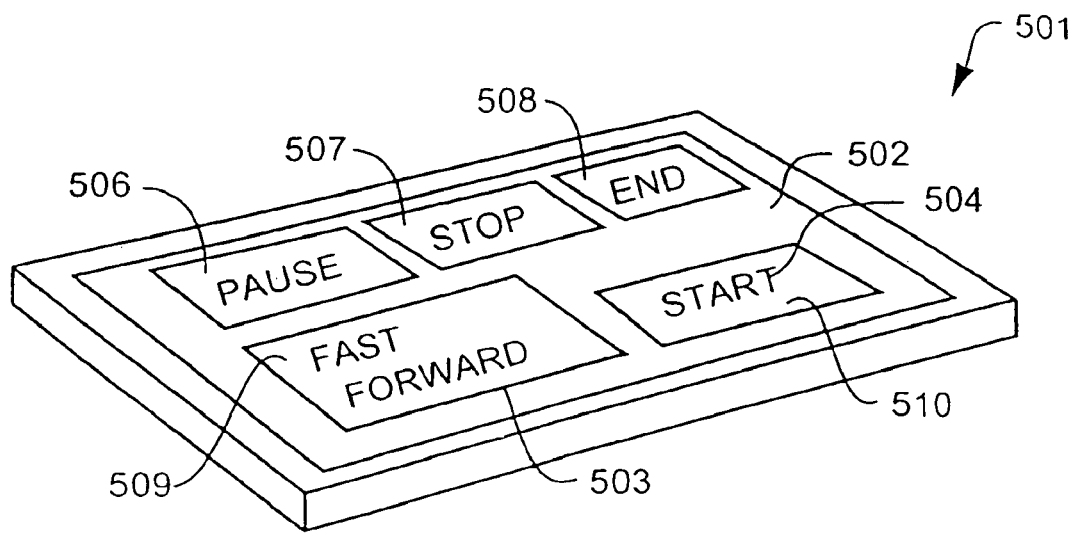
FIG. 26 is a perspective view of a smart card.

As seen in FIG. 26, a smart card 501 is provided with an upper surface. Marked on the upper surface 502 are various boundaries 503 which indicate the locations of operations able to be performed by the smart card 501 and indicia 504 in the form of text which indicates the function of each of the various operations. The boundaries 503 and indicia 504 are created by printing in a conventional manner. In the particular smart card illustrated in FIG. 26 there are five functions as follows: PAUSE 506, STOP 507, END 508, FAST FORWARD 509 and START 510.

It will be apparent that the arrangement of FIG. 26 suffers from the disadvantages referred to above if it is required to be used in the dark, if the user is long-sighted, if the user wishes not to divert his attention from a computer screen, and the like.

Figure 27:
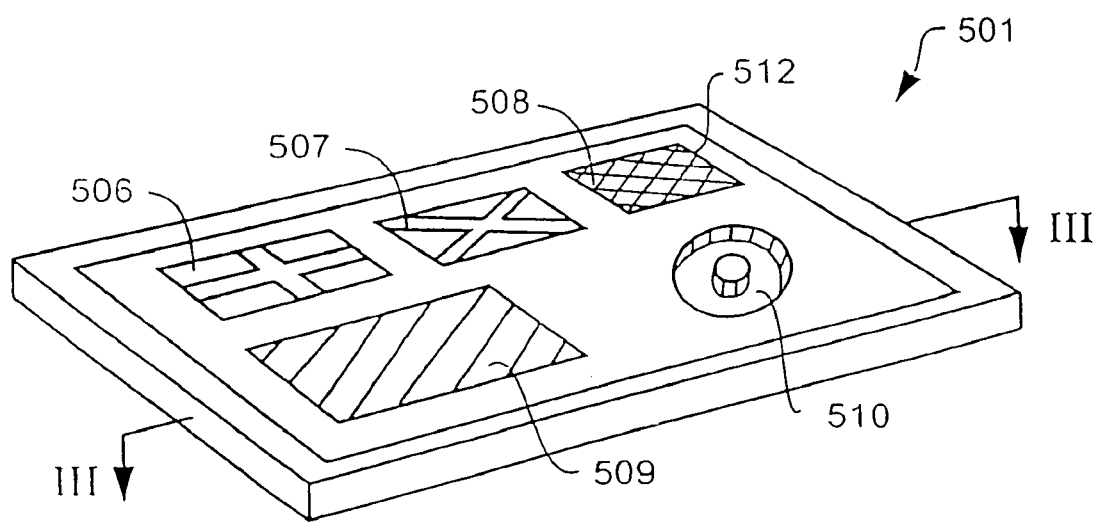
FIG. 27 is a similar view but of the smart card of another embodiment of the present invention.
Figure 28:
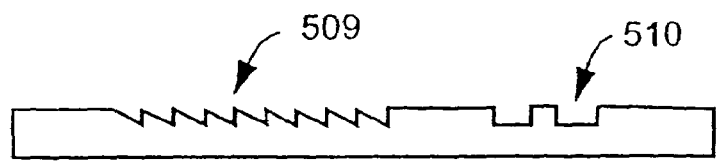
FIG. 28 is a transverse cross-sectional view along the line III—III of FIG. 27.

In accordance with a preferred embodiment of the present invention, as schematically illustrated in FIG. 27, the boundaries 503 and indicia 504 are each replaced by an area 512 which has a unique tactile characteristic. Thus the PAUSE indicium 6 is replaced by a Cross of St George, the STOP indicium 507 is replaced by a Cross of St Andrew, the END indicium 508 is replaced by an area of cross-hatch grooving, the FAST FORWARD indicium 509 is replaced by an area of diagonal grooving, and the START indicium 510 is replaced by an annular area of lower elevation having a central pillar of original elevation. The nature of the tactile indicia are clearly illustrated in FIG. 28 where the regions are seen in exaggerated cross-section.

It will be apparent that each of the areas 512 in FIG. 27 is able to be distinguished by touch by the user and therefore in order to operate the smart card 501 it is not necessary for the smart card 501 to be illuminated, or for the user to divert his attention from some other object such as a screen which the smart card controls.

Figure 29:
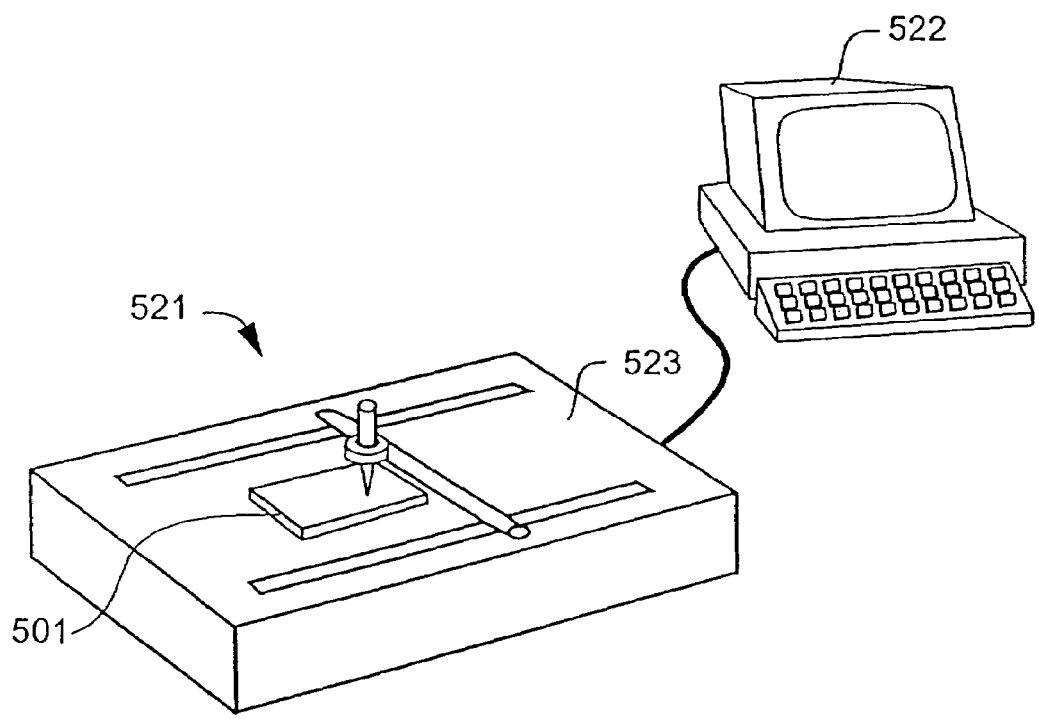
FIG. 29 illustrates a substantially conventional cutting plotter operated by computer software.

Turning now to FIG. 29, a computer driven cutting plotter 521, known per se and its controlling computer 522 are illustrated. The user of the smart card 501 places the smart card on the cutting table 523 and the computer 522 is loaded with data to indicate the position of the machined areas 512 and the nature of the machining. Thereafter, the machining can be carried out by the cutting plotter 521 so as to create the necessary machined areas 512.

In this way the user is able to determine for himself what type of tactile characteristic the user wishes to represent each function. That is to say the user determines that the pause indicium is to be represented by the Cross of St. George, and not, say, by a Maltese Cross. As a consequence, the user can carry out the operations by touch and memory without the necessity to read any indicia. This provides an important distinction between the described arrangement and, for example, Braille where it is necessary for the user to effectively learn an alphabet based on positions of dots (essentially a code) prior to being able to read Braille.

It is not necessary for the tactile characteristic to be formed by cutting as indicated in FIG. 29. Instead the printing technique of thermography can be used. This process produces a raised image by means of a resin "ink" which is printed onto a surface and then "baked". During the baking the resin expands to produce a raised surface. Many business cards use this process to create an expensive appearance.

Figure 22:
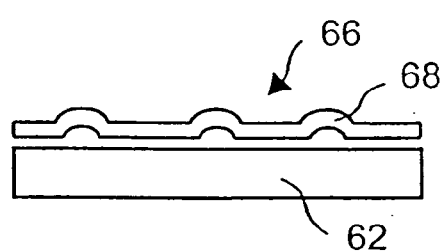
FIGS. 22 and 23 are a longitudinal section view and a perspective view respectively of another embodiment of the smart card shown in FIG. 1.
Figure 30:
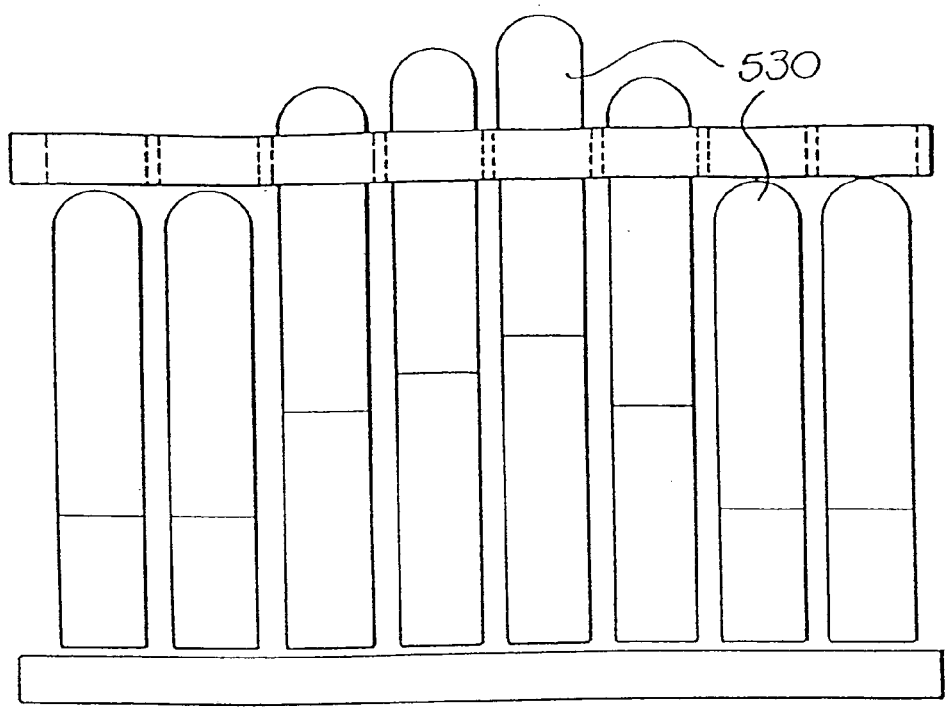
FIG. 30 is a side elevation of embossing pins.
Figure 31:
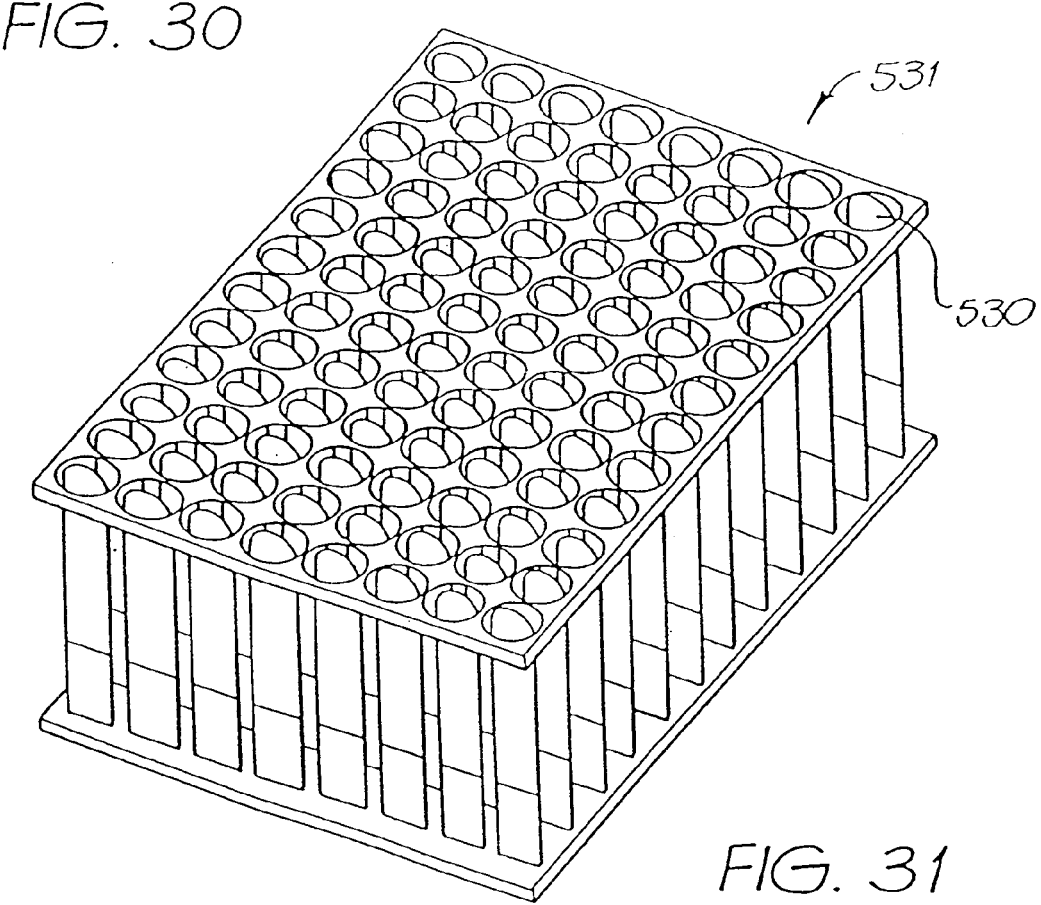
FIG. 31 is a perspective view from above of an array of the embossing pins of FIG. 30.

Another printing process which creates a raised surface is embossing. This can be done using pins 530 set out in dot matrix fashion with high resolution as schematically illustrated in FIGS. 30 and 31. The array 531 of pins illustrated in FIG. 36 would print part of, or all of, a single letter, for example. The pins 530 can be operated under computer control and thereby raised to permanently deform, or emboss, a sheet which is to form the upper surface of the smart card (66 for example). Such an embossed paper sheet can be glued to the upper surface of a substrate 62 as illustrated in FIG. 22.

Irrespective of the process used to create the tactile characteristic, the ability of the user to select his own tactile characteristics to suit the function he has programmed into his own smart card creates a user versatility which is highly thought of by many users.

As the mapping data takes the form of coordinate information corresponding with the various indicia, where an indicium is irregularly shaped (such as the St Andrews cross or a Maltese cross), a rectangular or other shaped bounding box can be used to reduce the amount of mapping required. Such a bounding box need not fully bound the particular indicium, and can be wholly or partially contained therein, depending upon the available space.

Turning now to FIGS. 32–37, it will be appreciated that the smart card technology of the present invention is applicable to Automatic Teller Machines (ATMs). In particular, the controller 1 of FIGS. 1 and 6 is equally applicable as a built-in card reader for an ATM. The functionality of the ATM can be substantially increased by the ability to render substantially opaque portions of the screen visible to the user. In this way the user's attention is concentrated only to those "keys", indicia or regions which are applicable choices at the relevant stage of the transaction.

Figure 32:
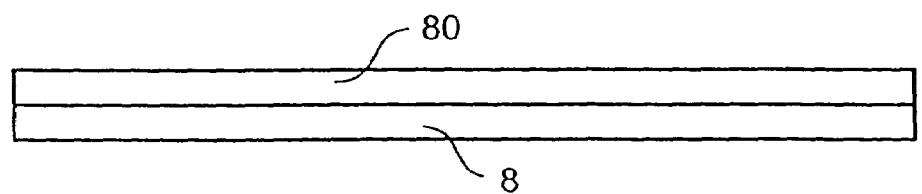
FIG. 32 is a longitudinal cross-sectional view of a pressure sensitive membrane and associated LCD layer for use with a preferred embodiment.

As shown in FIG. 32, a substantially transparent liquid crystal display (LCD) 80 overlies the pressure sensitive membrane 8, such that a user can still see through both layers. In this embodiment, described in FIGS. 32–37 the control template takes the form of a smart card 82 (FIG. 37) having on-board data storage means (not shown but similar to chip 19 of FIG. 3)) in the form of non-volatile memory. As with previous smart card embodiments, contacts (not shown but similar to contacts 18 of FIG. 3) are also provided to allow the smart card 82 to communicate mapping data from the storage means to the associated controller, which in this case is an Automatic Teller Machine.

The LCD layer 80 is an array of liquid crystal cells, each of which can selectively be turned "on" or "off". When a cell is "on", it allows substantially no light to pass and is therefore effectively opaque. When turned "off", the cell is substantially transparent to visible light. In other embodiments, the LCD layer 80 can be replaced by any form of display which is relatively thin and substantially transparent. Accordingly, thin film transistor (TFT) displays and the like, whether monochrome or colour, can be used without departing from the spirit and scope of the invention. Similarly, the display 80 can be placed above or below the pressure sensitive membrane 8, depending upon the preferred implementation and manufacturing considerations.

Figure 33:
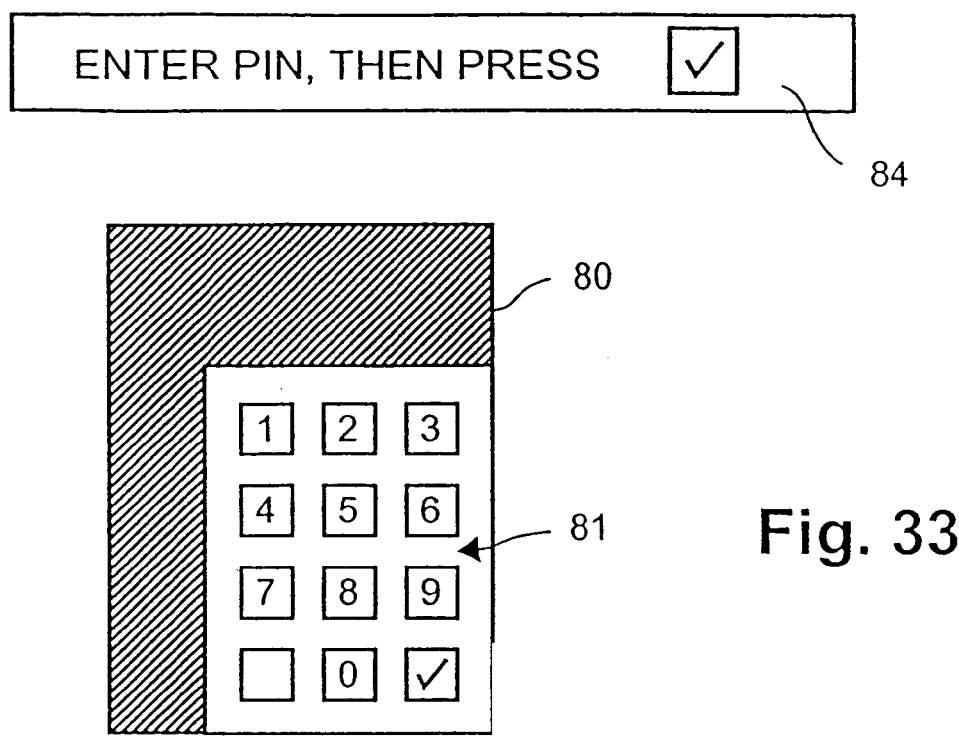
FIGS. 33 to 37 show various stages in the use of a control template with the arrangement shown in FIG. 32.
Figure 34:
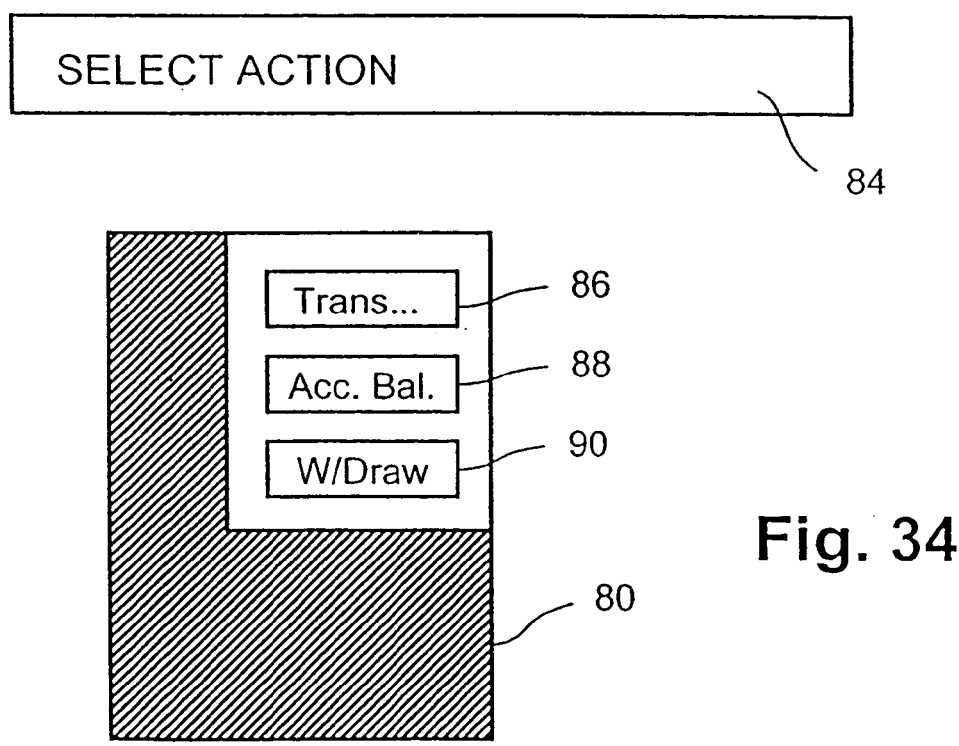

In use, the smart card 82 is inserted into a suitable receptacle associated with the ATM. Once the smart card 82 is in position, the LCD 80 is activated to block out all but the keypad 81 and confirm buttons, as shown in FIG. 33. An associated screen 84 tells the user that the ATM is expecting a personal identification number (PIN) to be entered, followed by the "confirm" button (represented by a "tick"). Once the user enters the required pin and presses confirm, the LCD 80 is changed to the configuration shown in FIG. 17, wherein the "transfer" button 86, "account balance" button 88 and "withdraw" button 90 are displayed. The screen 84 prompts the user to select a desired action. In this case, the user selects withdraw button 90.

Figure 35:
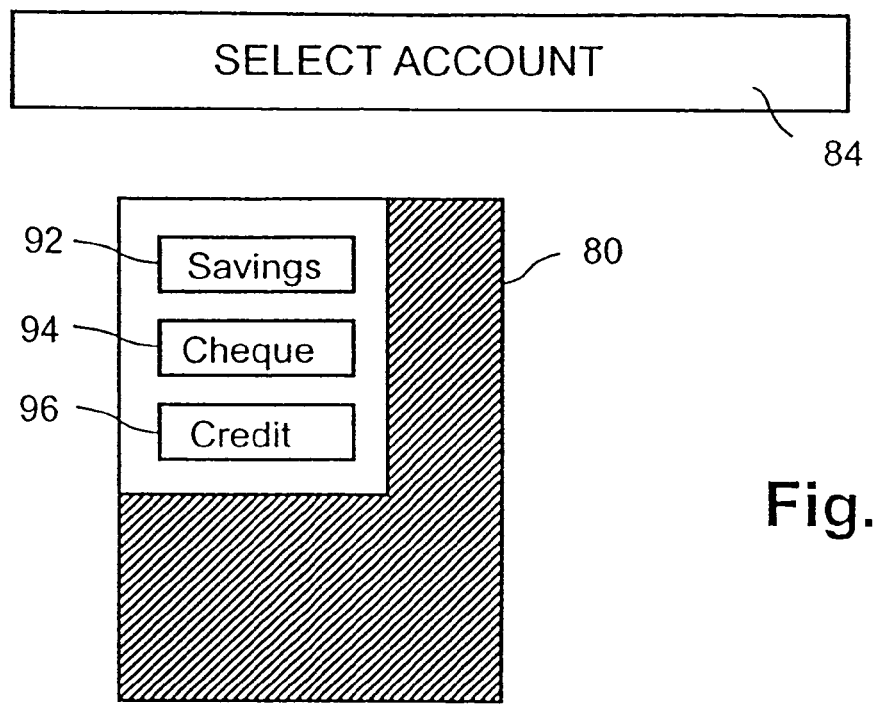

Once withdraw button 90 has been selected, the LCD layer 80 changes again, to provide the configuration shown in FIG. 35. The three buttons displayed are the "savings" button 92, "cheque" button 94 and "credit" button 96, and the screen 84 prompts the user to select an account. In this case, the user elects to withdraw money from the savings account and does so by pressing the "savings" button 92. Once the account has been selected, the LCD 80 is again reconfigured to that shown in FIG. 33 for the user to enter the amount to be withdrawn. In this case, the screen 84 prompts the user to enter the amount of money required to be withdrawn (not illustrated in FIG. 33).

Figure 36:
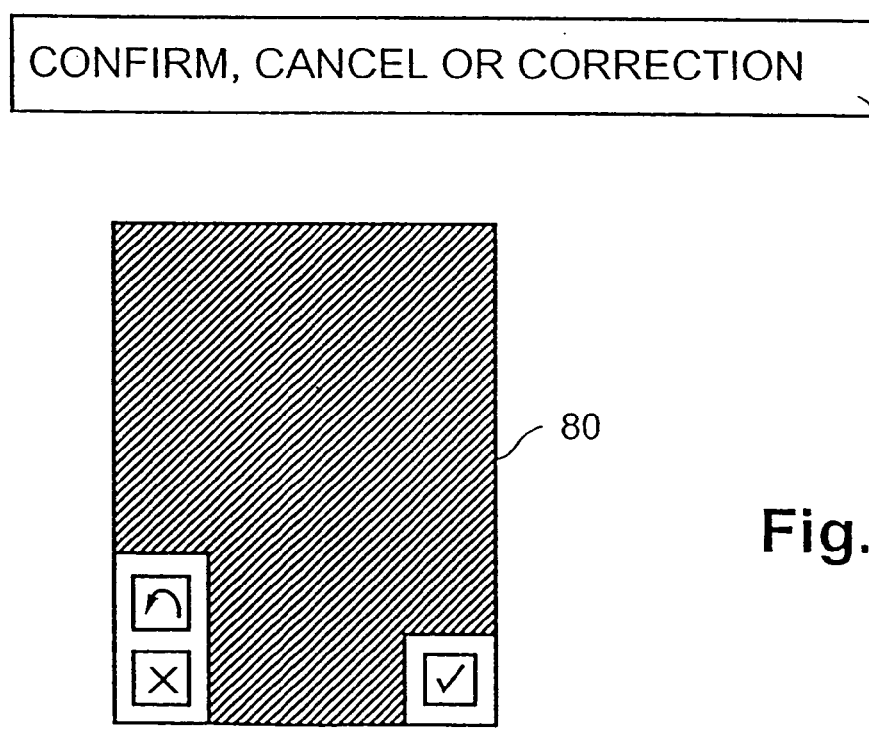

Once the user has entered the required amount and pressed confirm, the configuration of the LCD 80 is again changed to that shown in FIG. 36. The screen 84 prompts the user to confirm, cancel or withdraw. If the user presses cancel (the "X" button), the transaction is ended and the card 82 can be removed from the receptacle. If "correction" is selected, the LCD layer 80 will return to the previous configurations allowing the user to enter the correct amount to be withdrawn.

Once the confirm button has been entered, the ATM processes the requested transaction, and issues the required money through the conventional cash dispenser (not shown).

It will be appreciated that this embodiment can be applied to any situation in which a number of sequential steps need to be taken to complete a transaction. At each step, the LCD is configured to allow access only to available options, whilst blocking unavailable options.

A number of modifications of this embodiment are also available. For example, in one alternative embodiment, the LCD layer 80 can be configured to emphasise one or more available indicia, on the basis that those indicia are the most likely to be of interest to a user at a current stage of a transaction.

The emphasis can take any suitable form, including the use of a bounding box, flashing indicators or even animated arrows pointing to an emphasised indicium. In other embodiments, the LCD layer 80 provides other graphics images, including advertising or instructions such as those shown on screen 84. In one embodiment, one or more of the indicia is captioned with text or some other symbol to explain its purpose. For example, if a beetle image is used as a "play" button, as described in an embodiment above, the word "play" can be positioned over or adjacent the beetle by means of the LCD layer 80. It will be appreciated that the area surrounding the beetle needs to be of an appropriate colour to enable the LCD text to be visible. However, the background colour can also be included as part of the mapping data, thereby enabling the embodiment to only display text where it will be visible. In the case of a colour LCD layer 80 or other display medium, suitable contrasting colours can be selected on the basis of the background colour, or even of the indicia themselves.

Figure 37:
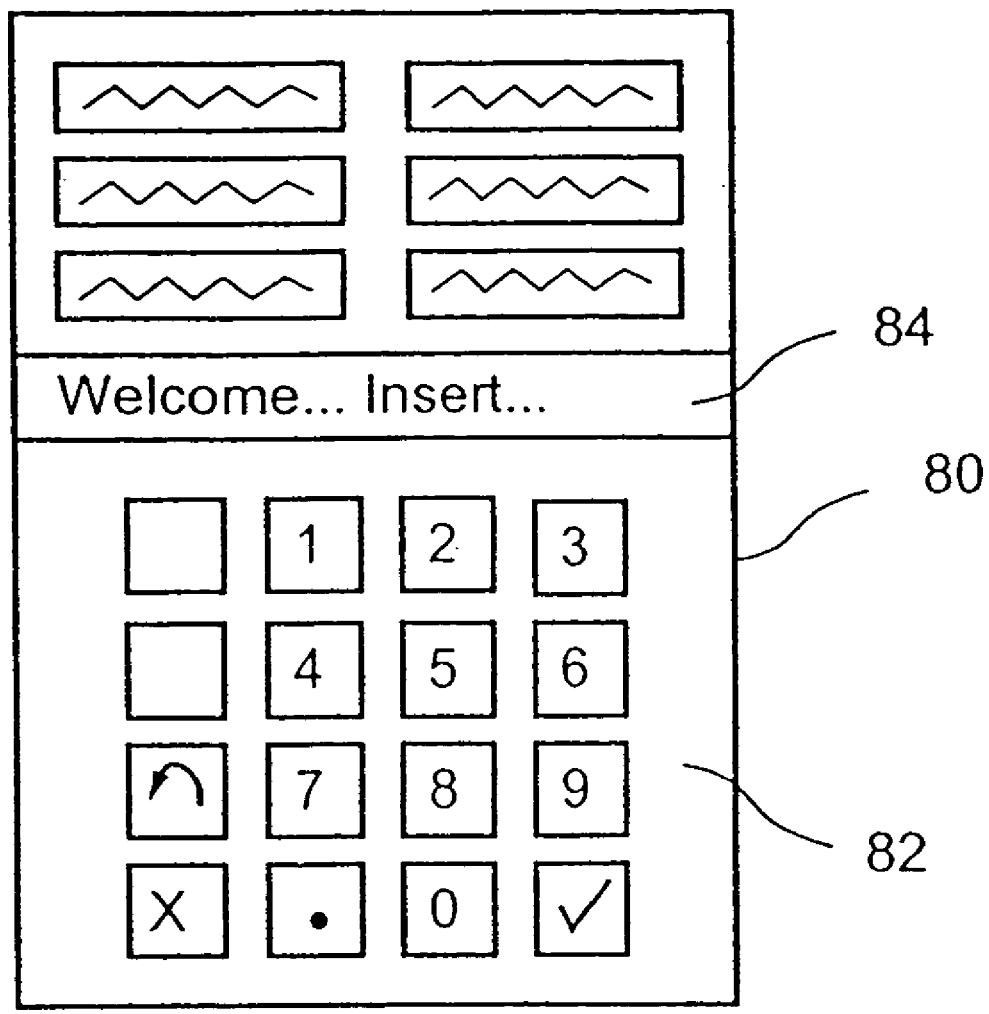

Another alternative embodiment is shown in FIG. 37, in which the screen 84 is superimposed over a relatively blank area of the smart card 82. The various messages are displayed by means of the LCD layer 80, and be scrolled across the smart card 82 when the message is too long to be displayed at once.

The embodiments above have been concerned mainly with the use of a pressure sensitive membrane positioned in a viewing area of a controller. However, it will be appreciated that any other form of sensing means capable of providing an indication of a user's selection can also be used. Non-limiting examples of these include capacitive or ultrasonic sensors, laser tracking systems, heat sensors or chemical detectors. It will also be appreciated that, where a pressure sensitive membrane is used, the pressure sensitivity can either be interpreted as a simple binary threshold, or as a multi-level or even substantially continuous pressure input. In one embodiment, the software which drives the pressure sensitive membrane allows a user to slide a finger across the surface of the membrane to indicate an increase or decrease in a value. For example, if a user drags a finger across the pressure sensitive membrane from left to right, this can be interpreted as an increase in, say, volume for a television remote control.

The methods of FIGS. 18C and 20 are preferably practised using a conventional general-purpose computer system 102 the exterior of which is illustrated in FIG. 6 and the interior of which is illustrated in FIG. 38. The processes of FIGS. 18C and 20 are able to be implemented as software, such as an application program executing within the computer system 102. In particular, the steps of the methods of FIGS. 18C and 20 are effected by instructions in the software that are carried out by the computer 102. The software is able to be divided into two separate parts; one part for carrying out the methods; and another part to manage the user interface between the latter and the user, the software is able to be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for carrying out the embodiments of the invention.

The computer system 102 takes the form of a computer module 201, input devices such as a keyboard 104 and mouse 203, output devices including the printer 107 and the display device 101. A Modulator-Demodulator (Modem) transceiver device 216 is used by the computer module for communicating to and from a communications network 220, for example connectable via a telephone line 221 or other functional medium. The modern 216 can be used to obtain access to the Internet, and other network systems, such as a Local Area Network (LAN) or a Wide Area Network (WAN).

The computer module 201 typically includes at least one processor unit 205, a memory unit 206, for example formed from semiconductor random access memory (RAM) and read only memory (ROM), input/output (I/O) interfaces including a video interface 207, and an I/O interface 213 for the keyboard 104 and mouse 203, a write device 215, and an interface 208 for the modem 216. A storage device 209 is provided and typically includes a hard disk drive 210 and a floppy disk drive 211. A magnetic tape drive (not illustrated)

is also able to be used. A CD-ROM drive 212 is typically provided as a non-volatile source of data. The components 205 to 213 of the computer module 201, typically communicate via an interconnected bus 204 and in a manner which results in a conventional mode of operation of the computer system 102 known to those in the relevant art. Examples of computers on which the embodiments can be practised include IBM-PCs and compatibles. Sun Sparestations or alike computer system evolved therefrom.

Typically, the application program of the preferred embodiment is resident on the hard disk drive 210 and read and controlled in its execution by the processor 205. Intermediate storage of the program and any data fetched from the network 220 may be accomplished using the semiconductor memory 206, possibly in concert with the hard disk drive 210. In some instances, the application program will be supplied to the user encoded on a CD-ROM or floppy disk and read via the corresponding drive 212 or 211, or alternatively may be read by the user from the network 220 via the modem device 216. Still further, the software can also be loaded into the computer system 102 from other compute readable medium including magnetic tape, a ROM or integrated circuit, a magneto-optical disk, a radio or infra-red transmission channel between the computer module 210 and another device, a computer readable card such as a smart card, a PCMCIA card, and the Internet and Intranets including email transmissions and information recorded on websites and the like. The foregoing is merely exemplary of relevant computer readable media. Other computer readable media are able to be practised without departing from the scope and spirit of the invention.

The method of FIG. 18C is alternatively able to be implemented in dedicated hardware as one or more integrated circuits performing the described functions or sub-functions. Such dedicated hardware is able to include graphic processors, digital signal processors, or one or more microprocessors and associated memories. Examples of such dedicated hardware include a set top box for a television.

INDUSTRIAL APPLICABILITY

It is apparent from the above that the embodiment(s) of the invention are applicable to the computer and data processing industries and the telecommunications industries.

The foregoing describes only some embodiments of the present invention, and modifications and/or changes can be made thereto without departing from the scope of the invention.

The invention claimed is:

1. A card customizing apparatus for customizing a card adapted for insertion into a card reader which communicates with a computer device, said card comprising selectable indicia on a surface of the card, and a storage device storing, for each said indicium, a plurality of commands related to a function of equipment, wherein selection of one of the indicia while the card is inserted into the reader causes said equipment to perform the function corresponding to the plurality of commands associated with the selected indicium, said apparatus comprising:
a processor configured to write said plurality of commands into the storage device of said card.

2. A card customizing apparatus according to claim 1, wherein the plurality of commands are inputted from a keyboard.

3. A card customizing apparatus according to claim 1, wherein said card storing the plurality of commands is printed by a writer device that is connected to said card customizing apparatus.

4. A card customizing apparatus according to claim 1, wherein:
one of said commands is a memory reference relating to a memory device external to said card; and
selection of said indicium causes accessing of corresponding data stored in the external memory device, using the memory reference associated with the selected indicium.

5. A card customizing apparatus according to claim 4, wherein said memory references are URLs.

6. A card customizing apparatus according to claim 4, wherein said memory references are telephone numbers.

7. A card adapted for insertion into a card reader which communicates with a computer device, said card comprising:
selectable indicia on a surface of the card; and
a storage device storing, for each said indicium, a plurality of commands related to a function of equipment, wherein
selection of one of the indicia while the card is inserted into the reader causes said equipment to perform the function corresponding to the plurality of commands associated with the selected indicium.

8. A card according to claim 7, wherein said card reader obtains said plurality of commands associated with the selected indicium and sends said plurality of commands to said computer device.

9. A card according to claim 7, wherein said computer device receives said plurality of commands associated with the selected indicium from said card via said card reader and communicates with an external memory device over a communications network using said plurality of commands to access corresponding data.

10. A card according to claim 7, wherein:
one of said commands is a memory reference relating to a memory device external to said card; and
selection of said indicium causes accessing of corresponding data stored in the external memory device, using the memory reference associated with the selected indicium.

11. A card according to claim 10, wherein the memory references are URLs.

12. A card according to claim 10, wherein the memory references are telephone numbers.

13. A card reader for a card, said card reader communicating with a computer device communicating with equipment over a network, said card being configured for insertion into said card reader, and wherein said card has indicia formed on a surface thereof, said card reader comprising:
a processor for (i) obtaining from a storage device on said card a plurality of commands related to a function of said equipment, said plurality of commands being associated with a selected one of the indicia of said card, and (ii) sending said plurality of commands to the computer device to thereby cause said equipment to perform the function corresponding to the plurality of commands associated with the selected indicium.

14. A card reader according to claim 13, wherein data is obtained from an external memory device over a communications network.

15. A card reader according to claim 14, wherein said external memory device is a server over the network.

16. A card reader according to claim 13, wherein said computer device is a set top box having an application to provide a service.

17. A card reader according to claim 16, wherein said application is loaded on said set top box.

18. A card reader according to claim 13, wherein:
one of said commands is a memory reference relating to a memory device external to said card; and
selection of said indicium causes accessing of corresponding data stored in the external memory device, using the memory reference associated with the selected indicium.

19. A card reader according to claim 18, wherein the memory references are URLs.

20. A card reader according to claim 18, wherein the memory references are telephone numbers.

21. A computer device for communicating with a card reader that receives a card, said computer device communicating with equipment external to the card, said card having indicia formed thereon, said computer device comprising:
a processor for receiving from said card reader a plurality of commands related to a function of said equipment, said plurality of commands being (i) stored in a storage device on said card and associated with a selected one of the indicia and (ii) used in said computer device to thereby cause said equipment to perform the function corresponding to the plurality of commands associated with the selected indicium.

22. A computer device according to claim 21, wherein said card reader reads said plurality of commands associated with the selected indicium from said card and sends said plurality of commands to said computer device that communicates with the equipment over a communications network to thereby access data.

23. A computer device according to claim 21, wherein:
one of said commands is a memory reference relating to a memory device external to said card; and
selection of said indicium causes accessing of corresponding data stored in the external memory device, using the memory reference associated with the selected indicium.

24. A computer device according to claim 23, wherein the memory references are URLs.

25. A computer device according to claim 23, wherein the memory references are telephone numbers.

26. A card customizing method for customizing a card to be used in a card reader, said card having indicia formed on a surface thereof, and said card reader communicating with a computer device that communicates with equipment external to the card, said method comprising the steps of:
writing, in regard to each said indicium, a plurality of commands related to a function of said equipment, said plurality of commands being associated with said each indicia and being used in the computer device to thereby cause, in response to selection of said indicium, said equipment to perform the function corresponding to the plurality of commands associated with said selected indicium, wherein said plurality of commands are written into a memory of said card.

27. A card customising method according to claim 26, wherein:
one of said commands is a memory reference relating to a memory device external to said card; and
selection of said indicium causes accessing of corresponding data stored in the external memory device, using the memory reference associated with the selected indicium.

28. A card customising method according to claim 27, wherein the memory references are URLs.

29. A card customising method according to claim 27, wherein the memory references are telephone numbers.

30. A computer program stored on a computer-readable medium, the program to be executed in a card customizing apparatus for customizing a card to be used in a card reader, said card having indicia on a surface thereof, and said card reader communicating with a computer device which communicates with equipment external to said card, said program comprising:
code to write, in regard to each said indicium, a plurality of commands related to a function of said equipment, said plurality of commands being used in the computer device to thereby cause, dependent upon a selected indicium, said equipment to perform the function corresponding to the plurality of commands associated with the selected indicium, wherein said plurality of commands are written into a memory of said card.

31. A computer program according to claim 30, wherein:
one of said commands is a memory reference relating to a memory device external to said card; and
selection of said indicium causes accessing of corresponding data stored in the external memory device, using the memory reference associated with the selected indicium.

32. A computer program according to claim 31, wherein the memory references are URLs.

33. A computer program according to claim 31, wherein the memory references are telephone numbers.

34. A method in a computer device for communicating with a card reader that receives a card, said card having indicia formed on a surface thereof, said computer device communicating with a equipment external to said card, said method comprising the steps of:
receiving from said card reader a plurality of commands related to a function of said equipment, said plurality of commands being stored in a storage device on said card and being associated with a selected one of the indicia and being used in said computer device to thereby cause said equipment to perform the function corresponding to the plurality of commands associated with said selected indicium.

35. A method according to claim 34, wherein:
one of said commands is a memory reference relating to a memory device external to said card; and
selection of said indicium causes accessing of corresponding data stored in the external memory device, using the memory reference associated with the selected indicium.

36. A method according to claim 35, wherein the memory references are URLs.

37. A method according to claim 35, wherein the memory references are telephone numbers.

38. A computer program stored on a computer-readable medium, the program to be executed in a computer device for communicating with a card reader that receives a card, said computer device communicating with equipment external to the card, said card having indicia formed on a surface thereof, said program comprising:
code to receive from said card reader a plurality of commands related to a function of the equipment, said plurality of commands being stored in a storage device on said card and associated with a selected one of the indicia, said plurality of commands being used in said computer device to thereby cause said equipment to perform the function corresponding to the plurality of commands associated with the selected indicium.

39. A computer program according to claim 38, wherein:
one of said commands is a memory reference relating to a memory device external to said card; and
selection of said indicium causes accessing of corresponding data stored in the external memory device, using the memory reference associated with the selected indicium.

40. A computer program according to claim 39, wherein the memory references are URLs.

41. A computer program according to claim 39, wherein the memory references are telephone numbers.

42. A method for controlling equipment via a communication network by a computer device that communicates with a card reader, said card reader being configured to receive a card that has indicia formed on a surface thereof, said method comprising the steps of:
communicating between the equipment which is external to the card and said computer device based on a plurality of commands related to a function of the equipment, said plurality of commands being associated with a selected one of the indicia, and said plurality of commands being sent from a storage device on said card via said card reader to said computer device; and
causing, according to the plurality of commands associated with the selected indicium, said equipment to perform the corresponding function, via said communication network.

43. A method according to claim 42, wherein:
one of said commands is a memory reference relating to a memory device external to said card; and
selection of said indicium causes accessing of corresponding data stored in the external memory device, using the memory reference associated with the selected indicium.

44. A method according to claim 43, wherein the memory references are URLs.

45. A method according to claim 43, wherein the memory references are telephone numbers.

46. A computer program stored on a computer-readable medium, the program executable to control equipment via a communication network by a computer device that communicates with a card reader, said card reader being configured to receive a card that has indicia formed on a surface thereof, said program comprising:
code to communicate between the equipment which is external to the card and said computer device based on a plurality of commands associated with a selected one of the indicia, said plurality of commands related to a function of the equipment, and said plurality of commands being sent from a storage device on said card via said card reader to said computer device; and
code to cause, according to the plurality of commands associated with the selected indicium, said equipment to perform the corresponding function, via said communication network.

47. A computer program according to claim 46, wherein:
one of said commands is a memory reference relating to a memory device external to said card; and
selection of said indicium causes accessing of corresponding data stored in the external memory device, using the memory reference associated with the selected indicium.

48. A computer program according to claim 47, wherein the memory references are URLs.

49. A computer program according to claim 47, wherein the memory references are telephone numbers.

50. A card adapted for insertion into a card reader which communicates with a computer device that communicates with equipment external to the card over a network, said card comprising:
selectable indicia on a surface of the card; and
a storage device storing, for each said indicium, a plurality of commands related to a function of the equipment, wherein selection of one of the indicia, while the card is inserted into the reader, provides a service based upon performance of the function by the equipment, said function being associated with the selected indicium.

51. A card according to claim 50, wherein:
one of said commands is a memory reference relating to a memory device external to said card; and
selection of said indicium causes accessing of corresponding data stored in the external memory device, using the memory reference associated with the selected indicium.

52. A card according to claim 51, wherein the memory references are URLs.

53. A card according to claim 51, wherein the memory references are telephone numbers.

54. A card reader for a card, said card reader communicating with a computer device that communicates with external to the card over a network, said card being adapted for insertion into said card reader, said card comprising selectable indicia on a surface of the card, and a storage device for storing, for each said indicium, a plurality of commands related to a function of the equipment, said card reader comprising:
a processor adapted for (i) obtaining, while the card is inserted into the reader and upon selection of one of the indicia, the plurality of commands associated with the selected indicium, and (ii) sending the plurality of commands to said computer device to thereby obtain a service based upon performance of the function by the equipment, said function being associated with the selected indicium.

55. A card reader according to claim 54, wherein:
one of said commands is a memory reference relating to a memory device external to said card; and
selection of said indicium causes accessing of corresponding data stored in the external memory device, using the memory reference associated with the selected indicium.

56. A card reader according to claim 55, wherein the memory references are URLs.

57. A card reader according to claim 55, wherein the memory references are telephone numbers.

58. A computer device for communicating with equipment over a network, and for communicating with a card reader that receives a card, said equipment being external to the card, said card comprising (i) selectable indicia on a surface of the card, and (ii) a storage device for storing, for each said indicium, a plurality of commands related to a function of the equipment, said computer device comprising:
a processor for (i) receiving from said card reader, while the card is inserted into said card reader, and upon selection of one of the indicia, the plurality of commands associated with the selected indicium, and (ii) receiving a service based upon performance of the function by the equipment, said function being associated with the selected indicium.

59. A computer device according to claim 58, wherein:

one of said commands is a memory reference relating to a memory device external to said card; and selection of said indicium causes accessing of corresponding data stored in the external memory device, using the memory reference associated with the selected indicium.

60. A computer device according to claim 59, wherein the memory references are URLs.

61. A computer device according to claim 59, wherein the memory references are telephone numbers.

62. A system comprising:

a set top box connected to an internet;

a card reader having a transparent touch sensitive membrane through which a plurality of indicia of an inserted card are visible, said card reader being adapted to communicate with said set top box;

said card being adapted for insertion into the card reader, the card having (i) a storage device, (ii) said plurality of indicia on a surface of said card, and (iii) a plurality of commands, associated with each said indicium, stored in the storage device, the plurality of commands associating each of the plurality of indicia with corresponding web pages stored in a server connected to the Internet; and a display that performs a function associated with corresponding commands associated with the selected indicium to thereby display a specific web page based upon the corresponding specific plurality of commands which said set top box receives from said card reader, wherein said card reader reads, upon selection of a specific one of the indicia while the card is inserted in the card reader, said specific plurality of commands associated with the selected indicum, and transmits the specific plurality of commands required to display the specific web page to said set top box.

63. A system according to claim 62, wherein:

one of said commands is a memory reference relating to a memory device external to said card; and selection of said indicium causes accessing of corresponding data stored in the external memory device, using the memory reference associated with the selected indicium.

64. A system according to claim 63, wherein the memory references are URLs.

* * * * *

UNITED STATES PATENT AND TRADEMARK OFFICE
CERTIFICATE OF CORRECTION

PATENT NO. : 7,121,462 B2
APPLICATION NO. : 10/657234
DATED : October 17, 2006
INVENTOR(S) : Seppo Reino Keronen et al.

It is certified that error appears in the above-identified patent and that said Letters Patent is hereby corrected as shown below:

COLUMN 5:
Line 67, "indicia" should read -- indicia. --.

COLUMN 8:
Line 52, "various;" should read -- various --.

COLUMN 11:
Line 7, "call" should read -- can --.

COLUMN 12:
Line 17, "list" should read -- list. --.

COLUMN 21:
Line 57, "indicia" should read -- indicium --.

COLUMN 22:
Line 38, "a" should be deleted.

COLUMN 24:
Line 32, "with" should read -- with equipment --.

Signed and Sealed this

Eighth Day of May, 2007

JON W. DUDAS
*Director of the United States Patent and Trademark Office*

UNITED STATES PATENT AND TRADEMARK OFFICE
CERTIFICATE OF CORRECTION

PATENT NO. : 7,121,462 B2
APPLICATION NO. : 10/657234
DATED : October 17, 2006
INVENTOR(S) : Seppo Reino Keronen et al.

It is certified that error appears in the above-identified patent and that said Letters Patent is hereby corrected as shown below:

COLUMN 5:
Line 67, "indicia" should read -- indicia. --.

COLUMN 8:
Line 52, "various;" should read -- various --.

COLUMN 11:
Line 7, "call" should read -- can --.

COLUMN 12:
Line 17, "list" should read -- list. --.

COLUMN 21:
Line 57, "indicia" should read -- indicium --.

COLUMN 22:
Line 38, "a" should be deleted.

COLUMN 24:
Line 32, "with" should read -- with equipment --.

Signed and Sealed this

Twenty-ninth Day of May, 2007

JON W. DUDAS
*Director of the United States Patent and Trademark Office*